(12) United States Patent
Wilson et al.

(10) Patent No.: US 7,696,901 B2
(45) Date of Patent: Apr. 13, 2010

(54) METHODS AND APPARATUS FOR PHOTONIC POWER CONVERSION DOWNHOLE

(75) Inventors: Colin Wilson, Kawasaki (JP); Soon Seong Chee, Kokubunji (JP); Les Nutt, Houston, TX (US); Tsutomu Yamate, Yokohama (JP); Masahiro Kamata, Kawasaki (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 805 days.

(21) Appl. No.: 11/532,904

(22) Filed: Sep. 19, 2006

(65) Prior Publication Data

US 2007/0062696 A1 Mar. 22, 2007

Related U.S. Application Data

(63) Continuation-in-part of application No. 10/104,320, filed on Mar. 22, 2002, now Pat. No. 7,187,620.

(51) Int. Cl.
*G01V 3/00* (2006.01)
(52) U.S. Cl. .............. 340/854.7; 340/854.3; 340/855.3; 340/855.8; 398/171; 398/141; 385/20; 385/22
(58) Field of Classification Search .............. 340/853.1, 340/854.3, 854.7, 854.6, 855.3, 855.8; 166/250.01; 398/171, 141; 385/20, 22
See application file for complete search history.

(56) References Cited

U.S. PATENT DOCUMENTS

| | | | |
|---|---|---|---|
| 3,373,817 A | 3/1968 | Cubberly, Jr. et al. | |
| 4,701,891 A | 10/1987 | Castagna et al. | |
| 4,710,977 A * | 12/1987 | Lemelson | .................. 398/171 |
| 4,953,136 A | 8/1990 | Kamata et al. | |
| 4,998,294 A * | 3/1991 | Banks et al. | ................. 398/171 |
| 5,044,460 A | 9/1991 | Kamata et al. | |
| 5,119,679 A * | 6/1992 | Frisch | .......................... 73/705 |

(Continued)

FOREIGN PATENT DOCUMENTS

EP 0409361 A2 1/1991

(Continued)

OTHER PUBLICATIONS

M. R. Islam, SPE, Dalhousie University, Faculty of Engineering, SPE 69440 "Emerging Technologies in Subsurface Monitoring of Petroleum Reservoirs", 2001, pp. 1-6.

(Continued)

*Primary Examiner*—Albert K Wong
(74) *Attorney, Agent, or Firm*—Matthias Abrell; Jody DeStefanis; Jeff Griffin

(57) ABSTRACT

Subterranean oilfield sensor systems and methods are provided. The subterranean oilfield sensor systems and methods facilitate downhole monitoring and high data transmission rates with power provided to at least one downhole device by a light source at the surface. In one embodiment, a system includes uphole light source, a downhole sensor, a photonic power converter at the downhole sensor, an optical fiber extending between the uphole light source and the photonic power converter, and downhole sensor electronics powered by the photonic power converter. The photonic power converter is contained in a high temperature resistant package. For example, the high temperature resistant package and photonic power converter may operate at temperatures of greater than approximately 100° C.

3 Claims, 12 Drawing Sheets

U.S. PATENT DOCUMENTS

| | | | |
|---|---|---|---|
| 5,271,075 A * | 12/1993 | Gfeller et al. | 385/20 |
| 5,597,042 A | 1/1997 | Tubel et al. | |
| 5,662,165 A | 9/1997 | Tubel et al. | |
| 5,664,035 A * | 9/1997 | Tsuji et al. | 385/24 |
| 5,667,023 A | 9/1997 | Harrell et al. | |
| 5,730,219 A | 3/1998 | Tubel et al. | |
| 5,796,890 A * | 8/1998 | Tsuji et al. | 385/24 |
| 5,857,710 A | 1/1999 | Leising et al. | |
| 5,859,719 A * | 1/1999 | Dentai et al. | 398/141 |
| 5,947,198 A | 9/1999 | McKee et al. | |
| 6,006,832 A | 12/1999 | Tubel et al. | |
| 6,019,173 A | 2/2000 | Saurer et al. | |
| 6,065,538 A | 5/2000 | Reimers et al. | |
| 6,131,658 A | 10/2000 | Minear | |
| 6,160,762 A | 12/2000 | Luscombe et al. | |
| 6,161,433 A | 12/2000 | Erath | |
| 6,192,983 B1 | 2/2001 | Neuroth et al. | |
| 6,253,848 B1 | 7/2001 | Reimers et al. | |
| 6,268,911 B1 | 7/2001 | Tubel et al. | |
| 6,269,198 B1 | 7/2001 | Hodgson et al. | |
| 6,269,883 B1 | 8/2001 | Gissler et al. | |
| 6,357,539 B1 | 3/2002 | Ruttley | |
| 6,374,913 B1 | 4/2002 | Robbins et al. | |
| 6,408,943 B1 * | 6/2002 | Schultz et al. | 166/285 |
| 6,526,818 B1 | 3/2003 | Head et al. | |
| 6,577,244 B1 | 6/2003 | Clark et al. | |
| 6,614,718 B2 | 9/2003 | Cecconi et al. | |
| 6,737,623 B2 * | 5/2004 | Suzunaga et al. | 250/206 |
| 6,978,832 B2 * | 12/2005 | Gardner et al. | 166/250.1 |
| 7,124,818 B2 | 10/2006 | Berg | |
| 7,359,647 B1 * | 4/2008 | Faria et al. | 398/171 |
| 2002/0000320 A1 | 1/2002 | Gissler | |
| 2002/0185273 A1 * | 12/2002 | Aronstam et al. | 166/250.01 |
| 2002/0196993 A1 | 12/2002 | Schroeder | |
| 2003/0081501 A1 | 5/2003 | Nightingale et al. | |
| 2003/0117895 A1 | 6/2003 | Brandsaeter | |
| 2006/0202109 A1 | 9/2006 | Delcher et al. | |

FOREIGN PATENT DOCUMENTS

| | | |
|---|---|---|
| WO | WO 98/50680 A2 | 11/1998 |
| WO | WO 01/77488 A1 | 10/2001 |
| WO | 2004/020774 | 3/2004 |

OTHER PUBLICATIONS

J. Algeroy, SPE, and R. Pollock, SPE, Schlumberger, SPE 62951, "Equipment and Operation of Advanced Completions in the M-15 Wytch Farm Multilateral Well", 2000, pp. 1-7.

Read Group, Inc., Marketing Brochure, Dec. 2001.

Schlumberger Marketing CD, 2000, Imaging the Invisible—Q-Borehole—, pp. 18-31.

S. T. Vohra, B. Danver, A. B. Tveten and A. Dandridge, "High Performance Fiber Optic Accelerometers", Proceedings of OFS-11, U.S. Naval Research Laboratory, pp. 654-657, 1996.

K. Dobashi, H. Arai, R. Sato and Y. Kohama, "A Study on the Allowable No. of Fiber-Optic Sensors with Time-Division Multiplexing", pp. 522-525, UDT, 1995.

Litton Catalog, "Fiber Optic Borehole System Hydrophone Array". Good Vibrations, Well Evaluation, pp. 19-33, 1988.

\* cited by examiner

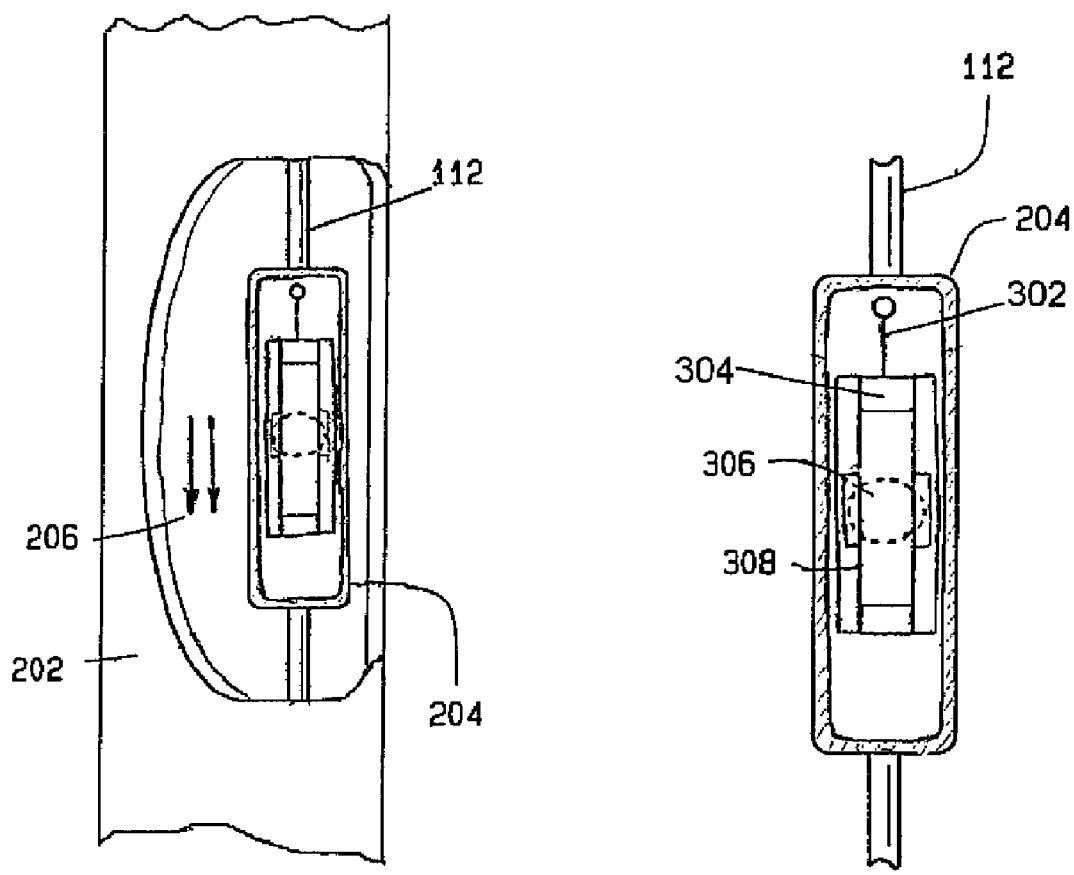
FIG. 2
FIG. 3
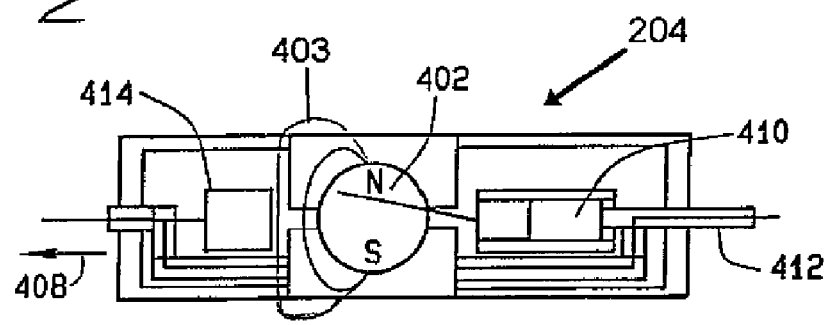
FIG. 4A
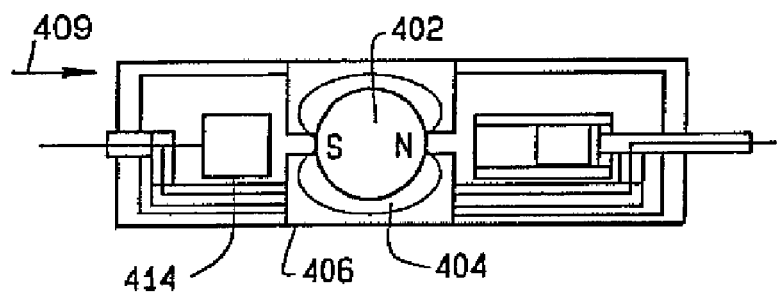
FIG. 4B

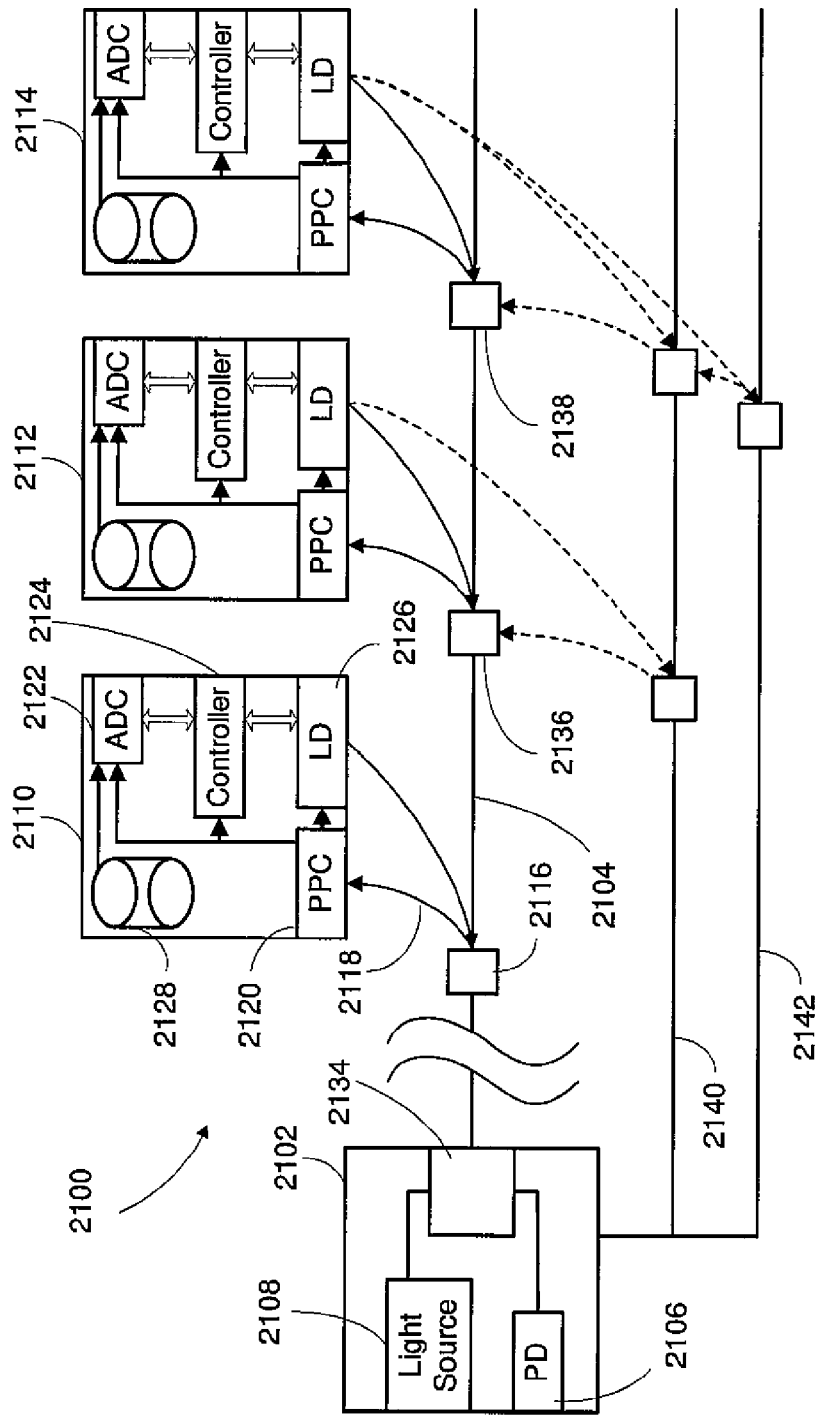
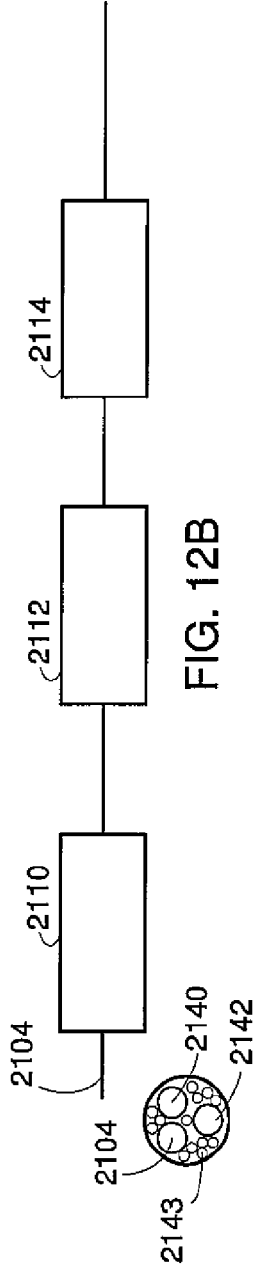
FIG. 12A
FIG. 12B

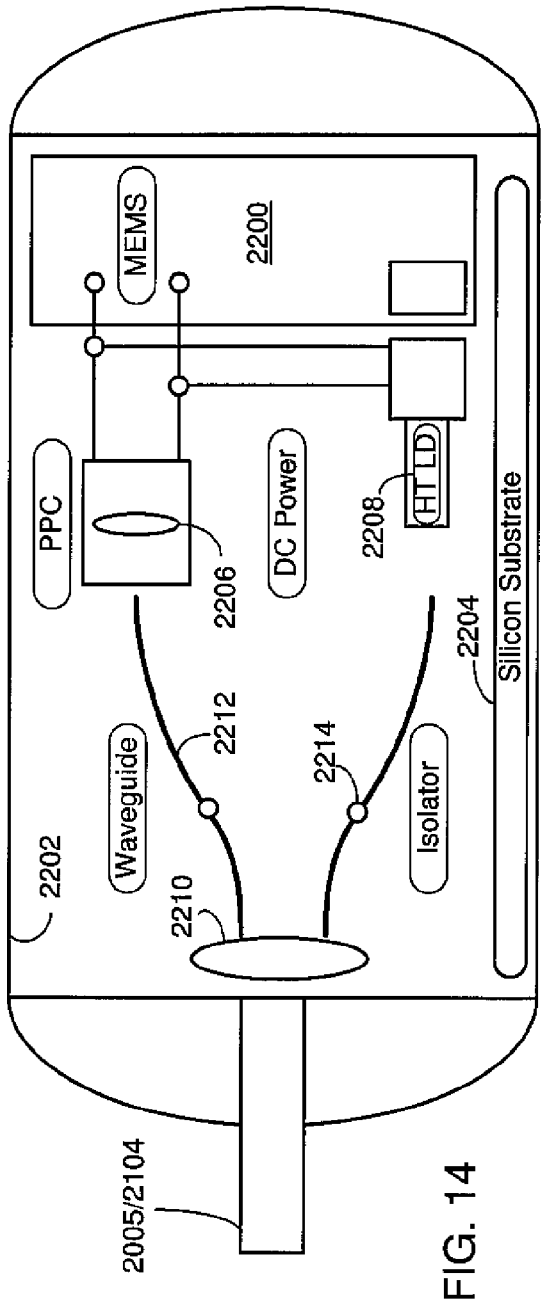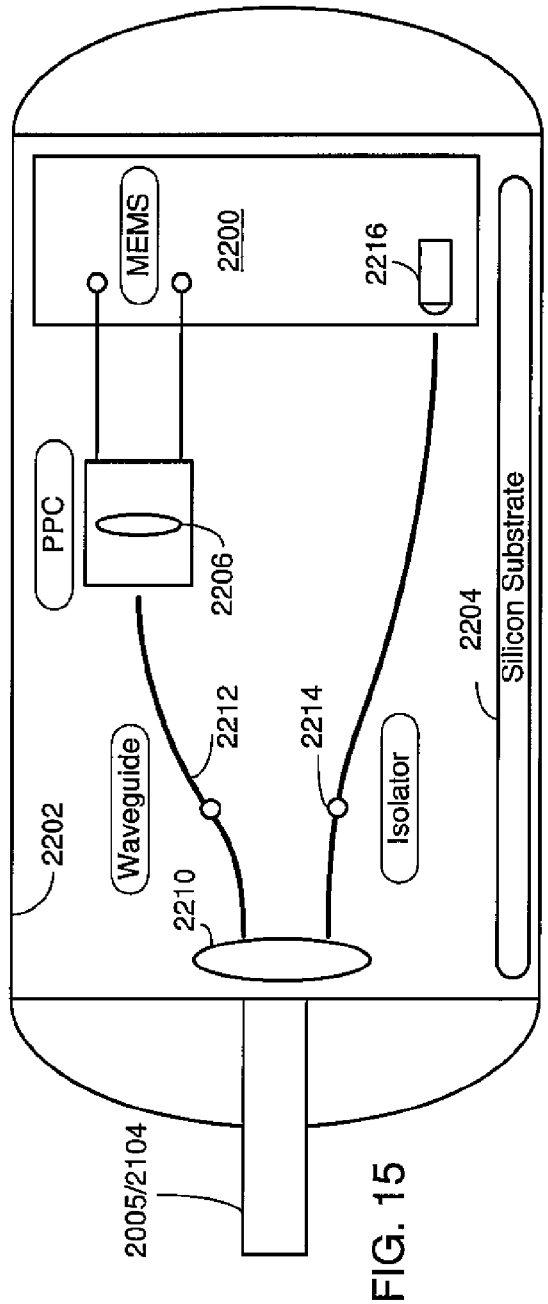
FIG. 14
FIG. 15

METHODS AND APPARATUS FOR PHOTONIC POWER CONVERSION DOWNHOLE

RELATED APPLICATIONS

This is a continuation-in-part of U.S. patent application Ser. No. 10/104,320, filed 22 Mar. 2002, and entitled "Method and Apparatus for Borehole Sensing."

FIELD

The present disclosure relates generally to methods and apparatus for powering and communicating with downhole tools and electronics. More particularly, the present disclosure relates to methods and apparatus for optically powering and communicating with downhole tools and electronics.

BACKGROUND

Logging and monitoring boreholes has been done for many years to enhance and observe recovery of oil and gas deposits. In the logging of boreholes, one method of making measurements underground includes attaching one or more tools to a wireline connected to a surface system. The tools are then lowered into a borehole by the wireline and drawn back to the surface ("logged") through the borehole while taking measurements. The wireline is usually an electrical conducting cable with limited data transmission capability. Similarly, permanent monitoring systems are established with permanent sensors that are also generally attached to an electrical cable.

Demands for higher data transmission rates for wireline logging tools and permanent monitoring systems is growing rapidly because of higher resolution sensors, faster logging speeds, and additional tools available for a single wireline string. Although current electronic telemetry systems have evolved, increasing the data transmission rates from about 500 kbps (kilobits per second) to 2 Mbps (megabits per second) over the last decade, data transmission rates for electronic telemetry systems are lagging behind the capabilities of the higher resolution sensors. In fact, for some combinations of acoustic/imagining tools used with traditional logging tools, the desired data transmission rate is more than 4 Mbps.

One technology that has been investigated for increased data transmission rates is optical communication. Optical transmission rates can be significantly higher than electronic transmission rates. However, even if fiber optic cables are used for data transmission, the issue of powering the sensors and electronics remains. The downhole sensors and/or electronics require electrical power.

Some sensors of a permanent system are often deployed with a monitoring tool that extends downhole and is integrally attached to the borehole casing. The attachment is typically accomplished with a mechanical surface force clamping device and the sensors are typically housed in a side passageway or lateral extending section associated with the sensor housing or production tubing which is laterally displaced from the primary flow passageway through the production tubing. See, for example, U.S. Pat. No. 6,253,848, issued Jul. 3, 2001 to Reimers et al. The permanent deployment monitoring tooling such as that taught in Reimers et al. cannot typically be retrieved or removed without destroying the wellbore rendering the tool and sensors unusable for future borehole seismic operations.

Many monitoring tools for permanently deploying seismic sensor arrays downhole are single level monitoring tools. However, due to the complex subsurface formation and strata and the various levels of the multiple production zones and reservoirs, multilevel monitoring tools are also required to monitor various levels simultaneously. The monitoring tool that deploys the sensor arrays will typically include a plurality of sensor housings or shuttles where each shuttle contains at least one sensor. While a plurality of shuttles is desirable, an excessive number of shuttles can result in an overly complex tool that is very large and difficult to deploy. The total number of shuttles is typically eventually limited by the general power consumption requirements of the downhole sensor, telemetry and clamping system. In general, a tool based on the general tool architecture as outlined above can quickly become large and complex when trying to increase the number of shuttles, resulting in a system that is both expensive and difficult to deploy. Due to system cost and high lost-in-hole risks, it can be impractical to deploy such a system permanently in a well. The number of shuttles is also limited due to power consumption requirements, costs and difficulty of deployment. Known borehole tools, including those utilizing fiber optic sensors, designed for permanently deploying sensor arrays typically include a surface force clamp attachment means for attaching the sensor arrays to the borehole casing. This type of attachment means results in a monitoring tool that is not retractable or reusable at a different site. A borehole sensing apparatus that is not easily removably deployed into a borehole and which cannot be retrieved and reused in other boreholes is a problem that exists.

Similarly, in the area of borehole logging, the number of transmitters and receivers and the distance between transmitters and receivers has been increasing to improve the ability to detect formation characteristics in the undisturbed formation farther from the borehole. One method to get deeper penetration is to increase the distance between source and receivers, such that the receivers are detecting signals that are returned from further distances in the borehole. A problem with increasing the distance between sources and receivers is that increasing tool size and length can result in increasing difficulties in deployment, longer periods of time required for logging, longer down-time for the well, and higher costs. There is a need for expanding the distance between acoustic sources and receivers, or utilizing additional receivers without increasing tool size.

The use of a magnetic clamping device as a method of attachment can also optionally be utilized to attach the sensors. However, the ability to magnetically clamp and unclamp the sensor downhole or at the well head does not resolve all retrieval problems because many times the tool, specifically the weight or main electronics cartridge, gets stuck downhole. Magnetic clamping alone will not address the issue of the stuck tool.

SUMMARY

The present specification provides some embodiments directed towards improving, or at least reducing, the effects of one or more of the above-identified problems. In one of many possible embodiments, a downhole oilfield sensor system is provided. The downhole oilfield sensor system comprises an uphole light source, a downhole sensor, a photonic power converter at the downhole sensor, an optical fiber extending between the uphole light source and the photonic power converter, and downhole sensor electronics powered by the photonic power converter. The photonic power converter is contained in a high temperature resistant package. For example, the high temperature resistant package and photonic power converter may operate at temperatures of greater than 85° C., at temperatures of approximately 100° C. or higher, at temperatures of 150° C. or higher, and at temperatures of approximately 200° C. or higher. The system may further comprise a laser diode powered by the photonic power converter, such as a laser diode suitable for high temperature operations.

In one embodiment of the subterranean sensor system, the downhole sensor is operatively attached to an optical fiber, and the high temperature resistant package comprises a pumpable package. In one embodiment, the downhole sensor comprises a MEMS sensor disposed on a substrate, and the substrate contains the photonic power converter. In one embodiment, the substrate may also contain a laser diode for communication uphole. The laser diode may be powered by the photonic power converter and optically connected to the optical fiber for communicating sensor data uphole In one embodiment of the subterranean sensor system, the optical fiber comprises only one, single-mode optical fiber. The single-mode optical fiber transmits light from the uphole light source, to the photonic power converter and transmits data to and from the downhole sensor electronics. In one embodiment, the downhole sensor is located on a wireline tool. In one embodiment the optical fiber comprises at least one of a single-mode and a multi-mode optical fiber, the optical fiber transmitting light from the uphole light source to the photonic power converter and transmitting data to and from the wireline tool. In one embodiment, the photonic power converter comprises at least 20% efficiency at temperatures up to at least 150° C. Some embodiments of the photonic power converter comprise at least 20% efficiency at temperatures up to at least 200° C. Some embodiments of the photonic power converter comprise at least 20% efficiency at temperatures up to at least 150° C. and light wavelengths of at least 1100 nm. In one embodiment, the photonic power converter comprises at least 20% efficiency at temperatures up to at least 200° C. and light wavelengths of at least 1260 nm. Some embodiments of the photonic power converter comprise at least 20% efficiency at temperatures up to at least 150° C. and light wavelengths of at least 1550 nm. In one embodiment, the photonic power converter comprises at least 30% efficiency at temperatures up to at least 200° C. and light wavelengths of at least 1310 nm.

One embodiment comprises a subterranean sensor system. The subterranean sensor system comprises an uphole, long wavelength optical light source, at least one subterranean sensor located downhole, a single-mode fiber optic line coupled to the optical light source and extending to the at least one subterranean sensor, and a photonic power converter coupled to the fiber optic line downhole, the photonic power converter electrically connected to the at least one sensor. In one embodiment, the photonic power converter is contained in a package capable of withstanding temperatures of at least 85° C. In some embodiments, the at least one subterranean sensor comprises multiple sensors and the photonic power converter comprises multiple photonic power converters, where at least one of the multiple sensors and one of the multiple photonic power converters are packaged in separate downhole modules, and each downhole module is optically coupled to the single-mode fiber optic line. In this, multiple units of photonic power converters may be provided for more power. In one embodiment, each downhole module is optically coupled to the single-mode fiber optic line by an optical add/drop multiplexer. One embodiment further comprises a telemetry system optically coupled to the single-mode fiber configured to relay sensor information uphole. In one embodiment, the at least one subterranean sensor is attached to the single-mode fiber optic line, and the at least one subterranean sensor and the photonic power converter are contained in a pumpable package. In one embodiment, the at least one subterranean sensor comprises a MEMS sensor disposed on a substrate, and the substrate contains the photonic power converter and a laser diode for communication uphole. In one embodiment, the MEMS sensor, photonic power converter, and telemetry driver are disposed in a pumpable package and connected to the single-mode fiber optic line.

One embodiment provides a subterranean sensor system comprising a substrate, a photonic power converter, a telemetry driver, and a sensor disposed on the substrate, a downhole pumpable package enclosing the substrate having the photonic power converter, telemetry driver, and MEMS sensor. The sensor may comprise one or more of a MEMS sensor and a low power sensor, such as, for example, a micro-sapphire gauge. The low power sensor may comprise associated electronics for conditioning signals from the sensor. One embodiment further comprises a fiber optic line connected to the photonic power converter and the telemetry driver. In one embodiment, the telemetry driver comprises a laser diode.

One embodiment provides a subterranean sensor system comprising an uphole optical light source and a plurality of downhole modules. Each of the plurality of downhole tool modules comprises a photonic power converter, a telemetry driver powered by the photonic power converter, a sensor and sensor electronics. The sensor electronics are powered by the photonic power converter. The system further comprises a main fiber optic line optically coupled to the uphole optical light source and extending to each of the plurality of downhole modules, an optical fiber lead connected between the main fiber optic line and each of the plurality of downhole modules, and an optical coupler at each junction between each optical fiber lead and the main fiber optic line. In one embodiment, the optical light source comprises a long wavelength light source. One embodiment further comprises an analog-to-digital converter at one or more of the plurality of downhole modules powered by the photonic power converter. The optical coupler may comprises an optical add/drop multiplexer. The telemetry driver may comprise a laser diode, and each downhole module comprises a laser diode configured at a different wavelength for communication of sensor information uphole. In one embodiment, the main fiber optic line comprises a single-mode fiber. In one embodiment, the photonic power converter and associated packaging are configured to operate at temperatures above 100° C.

One aspect provides an optical architecture. The optical architecture comprises a first uphole system that includes an amplified light source, for example, a broad band light source, a first optical coupler connected to the amplified light source, a wavelength division multiplexed splitter downstream of the optical coupler, an uplink photodiode split from the wavelength division multiplexed splitter, and a controller downstream of the photodiode. The architecture further includes a second downhole system comprising a second optical coupler, a photonic power converter in optical communication with the second optical coupler, an electronics package powered by the photonic power converter, an uplink modulated optical source optically connected to the second optical coupler, and a single optical fiber extending between the first and second systems. The single optical fiber transmits light from the amplified light source in a first direction to the photonic power converter, and also transmits data from the second system in a second direction to the photodiode. In one embodiment, the second system comprises a sensor in communication with the uplink modulated optical source. In one embodiment, the uplink modulated optical source is powered by the photonic power converter.

One aspect provides a method of logging or monitoring a wellbore. The method comprises powering an electronics package of a downhole sensor with an uphole laser source producing long wavelength light, packaging a downhole photonic power converter for high temperature, sending the long wavelength light from the uphole laser source downhole and transmitting data from a downhole sensor uphole along a single-mode optical fiber. In one embodiment, packaging comprises packaging the downhole photonic power converter, the downhole sensor, and a telemetry driver on a substrate and enclosing the substrate in a pumpable package.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate embodiments of the present invention and are a part of the specification. Together with the following description, the drawings demonstrate and explain the principles of the present invention.

FIG. 2 is an enlarged diagrammatic view of a cutaway from a portion of the borehole revealing the cable line extending therethrough and the shuttle attached thereto.

FIG. 3 is a cross section of a shuttle revealing the borehole sensors and the magnet clamp.

FIG. 4A is a cross section of the magnet clamp showing the hydraulic actuator and the magnet element in the clamp position.

FIG. 4B is a cross section of the magnet clamp showing the hydraulic actuator and the magnet element in the unclamped position.

FIGS. 7, 7a and 7b show a tubing conveying tool with a bow spring to shuttle interface.

FIGS. 8 and 8a show a bow spring shuttle and wire line conveyance.

FIGS. 9 and 9a show a shuttle embedded in the wire line with bow spring to sensor package interface.

FIG. 12A is a schematic of a downhole oilfield sensor system according to another embodiment.

FIG. 12B is illustrates a cross-section of a hybrid cable with fiber optics and copper wire that may be used in FIG. 12A according to one embodiment.

FIG. 14 illustrates a pumpable downhole MEMS sensor package powered by a PPC according to one embodiment.

FIG. 15 illustrates a pumpable downhole MEMS sensor package powered by a PPC according to another embodiment.

Figure 1:
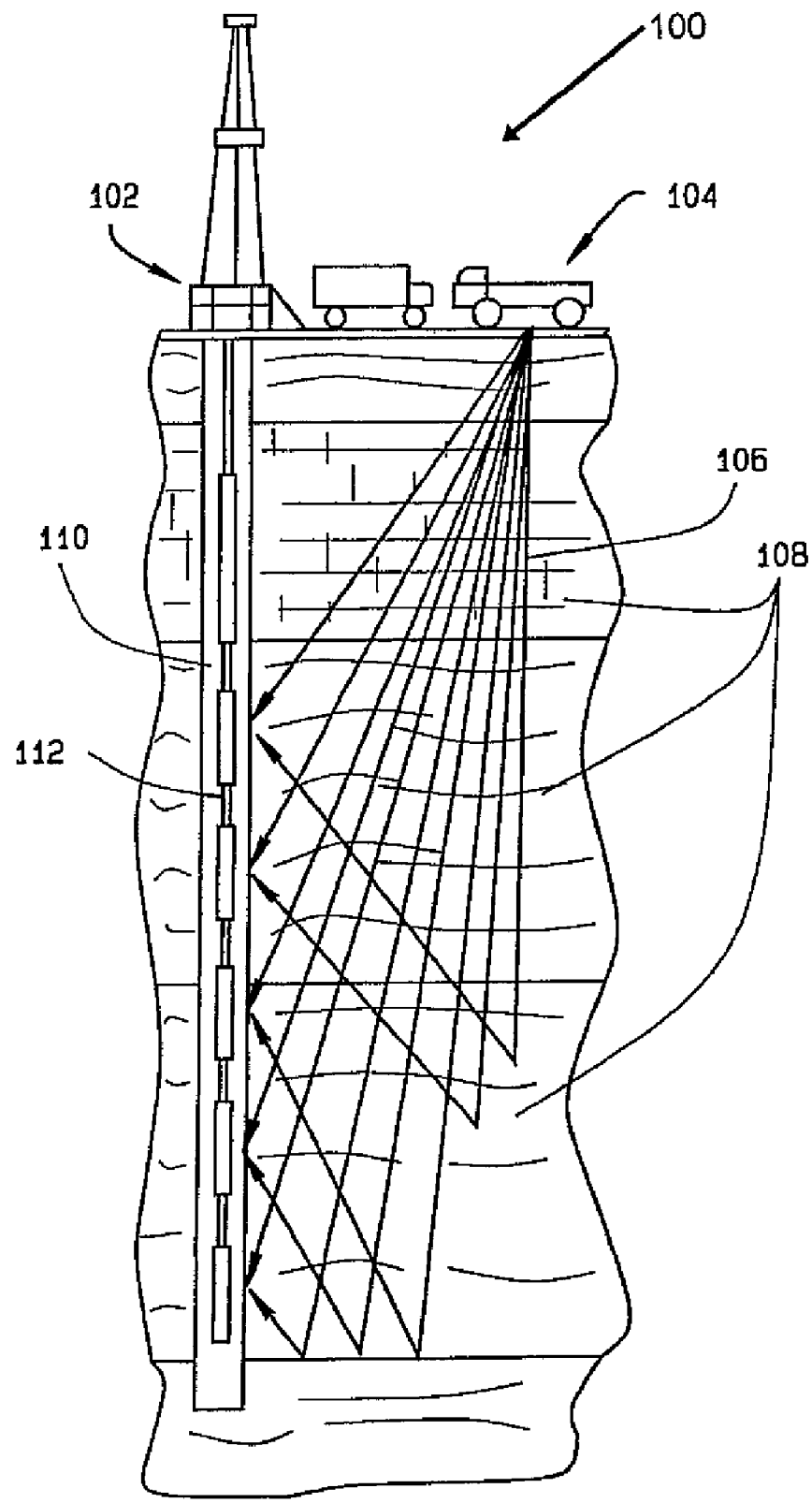
FIG. 1 is a diagrammatic view depicting a typical well site with a representation of a cross section of the subsurface formations with a borehole extending therethrough.

Throughout the drawings, identical reference numbers and descriptions indicate similar, but not necessarily identical elements. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the scope of the invention as defined by the appended claims.

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

Reference throughout the specification to "one embodiment" or "an embodiment" or "some embodiments" means that a particular feature, structure, or characteristic described in connection with the embodiment is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

The principles described herein contemplate methods and apparatus facilitating optical communications and power transmission between downhole tools and sensors, and surface systems. The use of fiber optics between downhole tools and the surface provides higher data transmission rates than previously available and may also provide power from the surface to the downhole sensors and electronics. The principles described herein facilitate fiber optic power transmission and communications between downhole tools and sensors, and associated surface systems, even in high temperature environments. Some of the methods and apparatus described below describe systems that are capable of using long wavelength, single mode communications, which reduces dispersion and loss over long distances.

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, and a combination tool. A "long" wavelength refers to light wavelengths over 940 nm. The words "including" and "having" shall have the same meaning as the word "comprising."

Aspects disclosed herein include an apparatus and method that utilize the benefits of fiber optic communication and sensor systems combined with a plurality of shuttle devices attached along a coiled tubing, or a cable line, wire line, slickline, or any other suitable downhole deployment means. The shuttle provides a housing for the sensors and each shuttle has a magnetic coupling clamp which enables effective and removable deployment or spooling down of seismic sensor arrays downhole into a survey borehole for recording multi-level three-dimensional borehole seismic data. Aspects of the borehole monitoring or deployment tool comprise a coiled tubing, or a cable line, wire line, slickline or any other suitable conveyance for extending a plurality of shuttle devices containing fiber optic seismic sensors where the shuttle devices have a magnetic coupling clamp controllably operable to fixedly engage and acoustically couple the shuttle to the borehole casing. The magnetic clamp is further controllably operable to disengage and uncouple the shuttle from the borehole casing.

Utilization of fiber optic sensor systems provides benefits from many advantages offered by fiber optic systems. For example, fiber optic systems can operate passively and therefore downhole electronics and associated power from the surface to operate the downhole electronics are not required. The ability to eliminate downhole electronics improves reliability of the downhole sensor systems particularly in higher temperature environments. The electronics necessary for operating the sensor arrays can be located at the surface and since the surface electronics can be relatively expensive, they can be shared with other wells and utilized for multiple downhole fiber optic sensor systems. Also, fiber optic technology allows for a smaller profile and lighter weight system. Still further, all of these capabilities are advantageous for acoustic and seismic imaging applications which require a large sensor array with high data transmission capabilities. In this regard, fiber optic sensors can also support multi-functional measurements through the fiber optic line. This feature has great advantage in wire line or cable line applications as well as production and formation monitoring sensor systems.

Aspects disclosed herein comprise a method of calibrating a borehole sensing system including providing a fiber optic sensor section on a conveyance system comprising a fiber optic communication fiber, where the sensors are communicably linked and acoustically coupled to a transducer and the conveyance system comprises at least one fiber optic communication fiber; communicably linking the fiber to an optical electronics converter, such as a photonic power converter disclosed herein, and communicably linking the optical electronics converter to the transducer, introducing an optical signal into the communication fiber, activating the transducers through detection of the optical signal by the fiber optic sensors, exciting the fiber optic sensors by activation of the transducers, measuring response of the sensors, determining expected response of the sensors based on input optical signal; and comparing measured response to expected response of the fiber optic sensors. Aspects of disclosure include calibrating a borehole sensing systems using fiber optic sensors, such as geophones. In certain aspects, at least one capacitor is provided for activation of the transducers, and comprising an opti-electrical converter in communication with the capacitor for charging the capacitor by introducing an optical signal into the fiber optic communication fiber.

In some aspects, the present disclosure provides an apparatus and method for removably deploying seismic sensor arrays down a borehole or wellbore for efficiently recording subsurface seismic data. The apparatus is designed such that a plurality of seismic sensors or seismic sensor arrays can be deployed down a wellbore by spooling down a plurality of seismic sensors attached to a wire line (cable line), slickline, coiled tubing or other suitable deployment mechanism. For purposes of this disclosure, when any one of the terms wire line, cable line, slickline or coiled tubing or conveyance is used it is understood that any of the above-referenced deployment means, or any other suitable equivalent means, may be used with the present invention without departing from the spirit and scope of the present invention. One embodiment of the apparatus is designed with a plurality of shuttle containers or simply shuttles, each shuttle containing a sensor array with the shuttles being attached along the wire line, coiled tubing or other deployment mechanism. The apparatus is adapted to lower or spool the wire line down the borehole then actuate a magnetic clamp integral with the shuttle to magnetically clamp and acoustically couple the sensors to the borehole casing. The apparatus is further adapted to deactuate the magnetic clamp, thereby unclamping the shuttle and sensors from the borehole casing. The apparatus is further adapted to retract the wire line and the plurality of shuttles and sensors attached thereto. The extending or retracting of the wire line or cable line can be accomplished by a spooling mechanism.

One embodiment entails the deployment of a plurality of shuttle devices having sensor arrays downhole into a well bore and then actuating a magnetic clamp, or simply magnetically clamping and acoustically coupling the shuttle to the borehole casing.

One embodiment comprises a sensor package which includes the borehole sensors and the magnet clamp as one integral unit or sensor package. With this embodiment, clamping results in the sensor package being clamped against the wall of the shuttle and the entire shuttle then being clamped against the borehole casing. This results in acoustic coupling between the sensor package, shuttle and casing. Please note however that one embodiment of the invention can comprise a sensor package designed to be already acoustically coupled to the shuttle without magnetic clamping whereby the magnet clamp only needs to clamp the shuttle to the borehole casing or any other adjacent structure. This embodiment is not shown in the drawing but would be clear to one of ordinary skill and is well within the scope of this invention. Once the borehole data has been gathered, the apparatus is operable such that the magnet clamps can be deactuated such that extracting the sensor arrays can be performed.

One embodiment of a conveyance tool comprises a coiled tubing as a method of conveyance and a shuttle attached thereto by a bow spring. When the coiled tubing is deployed, the bow spring can be collapsed against the tubing such that the shuttle attached thereto will be held against the exterior of the tubing. A magnet attached on the exterior of the tubing and aligned with the magnet clamp is designed to facilitate holding the shuttle against the tubing. When the coiled tubing tool is deployed to the appropriate depth or position, the bow spring tension can be released thereby extending the shuttle outward from the tubing toward the borehole casing. This configuration is adapted to further facilitate coupling the shuttle to the borehole casing.

Another embodiment of a shuttle having a magnetic clamping device comprises a wire line conveyance with a two-part shuttle attached thereto. The two-part shuttle comprises an exterior cradle shuttle portion and a main sensor shuttle portion attached thereto by a bow spring.

The main sensor shuttle portion contains the sensing devices similar to the shuttle described in FIGS. 2 through 4. When the bow spring is collapsed within the exterior cradle shuttle portion, the main sensor shuttle portion is cradled therein. When the tension of the bow spring is released, the main sensor shuttle extends outward from the exterior cradle shuttle portion. This embodiment also further facilitates coupling the shuttle to the borehole casing.

Another embodiment of a conveyance tool comprises a shuttle embedded in a wire line conveyance. The shuttle is designed to be embedded in the wire line such that the outer diameter of the shuttle is approximately the same as the diameter of the wire line conveyance. The shuttle again is a two-part device comprising an exterior cradle shuttle portion and a main sensor shuttle portion attached thereto by a bow spring. As described above, the bow spring interface is designed to retract and extend the main sensor shuttle portion.

Another embodiment comprises a borehole sensing system have a breakaway system. The breakaway system is designed such that the conveyance has a sensor section where the sensors are attached and the conveyance has its weakest point at the base of the sensor section such that the conveyance could be broken at that weakest point to recover the upper portion of the tool including the sensor section while leaving the portion of the tool below the breakaway point for later retrieval. A further embodiment provides a tension-sensing device to sense or determine tension in the conveyance. Such a breakaway system may be incorporated into any of the embodiments above.

Another embodiment comprises a method for obtaining geophysical information about subsurface formations comprising deploying a shuttle, having a sensor package therein in a borehole for sensing data where the sensor package has a magnet clamp operable to selectively magnetically clamp the shuttle to an adjacent structure; selectively clamping the shuttle to the adjacent structure with the magnet clamp acoustically coupling together the sensor package, the shuttle, and the adjacent structure; deploying an acoustic source into the borehole; generating an acoustic signal in the borehole; and sensing borehole data with the sensor package. A particular embodiment comprises deploying an acoustic source disposed in a sonic tool into the borehole.

Referring to FIG. 1, a diagrammatic view of a well site is shown with a diagrammatic representation of a cross section of the subsurface formations with a borehole extending therethrough. The diagrammatic view 100 depicts well instrumentation 102 at the surface including all associated instrumentation and monitoring systems. Also shown at the surface is a surface source 104 which is depicted as a vibration vehicle. The plurality of lines 106 are intended to represent excitations or seismic vibrations traveling through the subsurface formations producing seismic data that can be sensed by downhole sensor arrays. The present systems and methods can be utilized to record seismic data for conducting a seismic survey of the subsurface formations 108. Aspects herein can also be utilized to control and monitor operations during production by monitoring seismic data from the various subsurface formations, regions, and zones. In the monitoring capacity, the disclosure herein can be utilized to optimize production of the well. The placement of the well bore 110 can be strategically located based on known seismic survey data that may have been previously obtained. Optimal placement of the well bore is desired such that optimal recording of seismic data for the subsurface formations of interest can be obtained.

Once the well bore has been established, a wire line (cable line) 112, a coiled tubing or other conveyance can be spooled to extend down through the well bore where the plurality of sensor arrays are positioned along the wire line 112. Also, note that the wire line with the seismic sensors attached thereto can be extended as the well bore is being established. The principles described herein can be either permanently deployed for continuous production well monitoring or can be temporarily deployed for performing a subsurface seismic survey and then retracted. If the present invention is temporarily deployed, it can be reutilized in a subsequent well bore operation once it has been retrieved. This feature provides a great advantage over other systems presently available. Permanent deployments enable continuous monitoring of production well operations. Once the wire line and the plurality of sensor arrays are in position, seismic data can begin to be gathered. If production ceases at the well or for some other reason seismic monitoring is no longer required, the system can be retracted and reutilized elsewhere. Note that the diagrammatic illustrations presented herein to describe embodiments are for the purpose of illustration and ease of understanding the apparatus and methods. The diagrammatic illustrations shown and described herein should not be construed to be limiting in any way with respect to the scope of the claims.

Referring to FIG. 2, a diagrammatic view of a cutaway from a portion of the borehole casing is shown with the cable line or wire line extending therethrough having a shuttle attached thereto. In this view, a portion of the borehole casing 202 is shown with a sectional cutaway revealing the wire line 112 and a shuttle carrier 204 attached thereto. The wire line with the shuttle attached thereto can be spooled to extend down through the borehole as indicated by arrows 206. A shuttle 204 houses a borehole sensor array and a magnetic clamping device utilized to acoustically couple the shuttle and sensors to the borehole casing. The wire line 112 can include at least one communication line and can include at least one hydraulic pressure line. One embodiment of the communication line can be fiber optic to interface with a fiber optic acoustic sensor device for uphole transmission of seismic data. The hydraulic line can be any appropriate actuator line, electronic or otherwise, that is adapted to actuate the magnetic clamp.

Referring to FIG. 3, a cross section of a shuttle revealing the borehole sensors and the magnetic clamp is shown. The shuttle carrier 204 is attached to the wire line 112. Internal to the shuttle housing is a fine wire suspension 302 which is part of an acoustic isolator 304 which acoustically isolates the sensor package 308 from the shuttle 204. The shuttle and sensor package is designed to be mechanically reliable and acoustically robust to isolate the sensor package from the dynamics of the wire line or cable line 112 and to insure independent seismic recording at each shuttle and sensor package. The acoustic isolation system includes a fine wire suspension line 302 integral with an acoustic isolator which acts as a suspension spring with a high damping factor between the carrier (shuttle) and the sensor package 308. In one embodiment, the acoustic isolator 304 can be three quad rings attached to the fine wire suspension that in combination act as a suspension spring. One example of fine wire suspension is fine wire rope. However, the acoustic isolator can be any appropriate suspension spring-type mechanism. The acoustic isolation system is designed such that the motion of each sensor package becomes independent and is protected from the noise transmitted through the wire line 112. This allows seismic signals to be acquired without interference from any dynamics of the shuttle carrier 204 and the wire line 112. Also, by separating the heavy part of the shuttle from the sensor part, the ratio of the clamping force to the moving mass increases. This provides better coupling conditions between the sensor package and shuttle combination and the casing. Also, when the wire line and shuttle are dragged upward, the fine wire suspension pulls up the sensor package. With the magnetic damper 306 on, the fine wire suspension allows the sensor package to align with, and at the same time, be in full contact with the borehole casing, thereby establishing a good coupling condition during the drag operation. The drag operation can be utilized when an undesired rocking motion is occurring. Rocking motion occurs when the sensor package has not established good contact. The sensor package under these conditions will begin a seesaw motion. A solution to this problem is to perform the drag upward operation to establish a stable contact. Although some embodiments use the above described acoustic isolation system, it is also recognized and anticipated that the sensor package can be acoustically coupled to the shuttle through a wide variety of other means including being permanently affixed to the interior of the shuttle prior to being deployed downhole.

One embodiment utilizes fiber optic geophones as the borehole sensors for converting present seismic waves into electro-optical signals that can be transmitted across fiber optic communication lines. For this embodiment of the invention, fiber optic communication lines will be utilized in the cable line for transmitting seismic data uphole.

The same sensor package devices can be utilized for both the non-bow spring configurations shown in FIGS. 2 through 4 and the bow spring configurations shown in FIGS. 7 through 9 to be discussed below. Also, one embodiment can be designed such that the sensors provide triaxial capability or three-dimensional capability whereby each shuttle comprises a sensor array of at least three mutually orthogonal geophones which are fixed relative to the sensor package geometry. In another embodiment, each shuttle comprises a hydrophone. Each of the shuttle and sensor packages that are installed along the wire line will monitor and record seismic activity at its respective depth.

Referring to FIGS. 4A and 4B, a schematic representation of the damper is shown in both its actuated clamper on position, FIG. 4A, and its deactuated damper off position, FIG. 4B. Also shown in FIGS. 4A and 4B is a schematic representation of sensors 414. Also shown is an actuator device 410 for positioning the permanent magnet. The magnetic damper and sensor package in shuttle carrier 204 includes a cylindrical shape permanent magnet 402 that is polarized in the radial direction. The permanent magnet is reciprocally mounted in pole pieces 406 such that it can reciprocally rotate about its cylindrical axis. The magnet position as shown in FIG. 4A is representative of the magnetic damper on position or the acoustic clamping position as shown by arrow 408. FIG. 4B shows a magnet position representative of the magnetic damper off position or release position as shown by arrow 409. The magnetic camper is activated when an actuator turns the permanent magnet 402 90 degrees from the position shown in FIG. 4B to the position shown in FIG. 4A. When the magnetic damper is in the release position as shown in FIG. 4B, magnetic flux 404 is redirect to be closed or contained in the pole piece 406 to prevent magnetic flux leakage. When the magnetic damper is in the clamped position as shown in FIG. 4A, magnetic flux 403 is redirected to go outside of the pole pieces such that the flux comes out of either pole piece and goes back through the casing to the other pole piece generating a strong clamping force. The clamping force is perpendicular to the casing as shown by arrow 408. The magnetic damper, integral with the sensor package 308, is lightweight making the effective clamping mass small. The actuator for rotating the cylindrical permanent magnet 90 degrees is shown as a hydraulic actuator 410. The hydraulic line 412 allows for remote actuation of the hydraulic actuator 410 adapted to rotate the cylindrical magnet 90 degrees. The actuator 410 could be actuated by any other appropriate actuator means such as an electrical actuator or an electromechanical actuator and an appropriate corresponding signal line would replace the hydraulic line. The same magnetic sensor device discussed above can be utilized for the bow spring shuttles described in FIGS. 7 through 9.

Also shown in FIGS. 4A and 4B is a representation of a seismic sensor 414. The seismic sensor is a device for sensing and converting seismic waves into electro-optical signals. Examples of seismic sensors include hydrophones, geophones, fiber optic geophones, three-axis seismic sensors, or geophone accelerometers.

Figure 5:
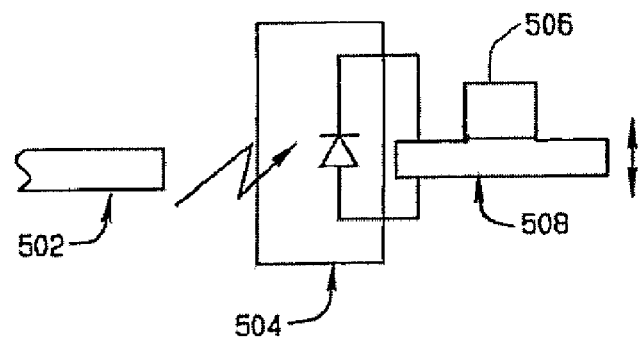
FIG. 5 is a representative schematic of a downhole arrangement showing the use of a fiber optic sensor.

Referring to FIG. 5, a representative schematic of the downhole fiber optic sensor with downhole calibration capability is shown. FIG. 5 shows a fiber optic communication fiber 502 communicably linked to an optical electronics converter 504 which is further communicably linked to the fiber optic seismic sensor 506 and the transducer 508 utilized for calibration. Types of transducers include piezoelectric transducers and electromagnetic transducers. One particular embodiment provides piezoelectric transducers. One embodiment of a calibration technique is shown where calibration can be performed without downhole power supplies or other complicated downhole electronics. Downhole calibration is advantageous to quantify the sensor response. The combination of an optical electronics converter 504 and a transducer 508 allows the downhole calibration of the fiber optic geophone to be performed in-situ with minimal downhole electronics. One method is to provide a light source through the optical fiber. The photo detectors of the fiber optic geophone will produce the modulated photo current which will activate the piezoelectric transducers. The transducers are acoustically coupled to the fiber optic geophones and excite the geophones as shakers. Calibration is allowed because of the known input signal and the expected response. The same fiber optic communication line can be shared for both measurement and calibration signals. A further embodiment includes providing a capacitor in communication with the transducers 508 to provide energy for activating the transducers 508. One method to store energy in the capacitor is to provide opti-electric converters in conjunction with the capacitors and to charge the capacitor with a light provided to the optical fiber.

Figure 6:
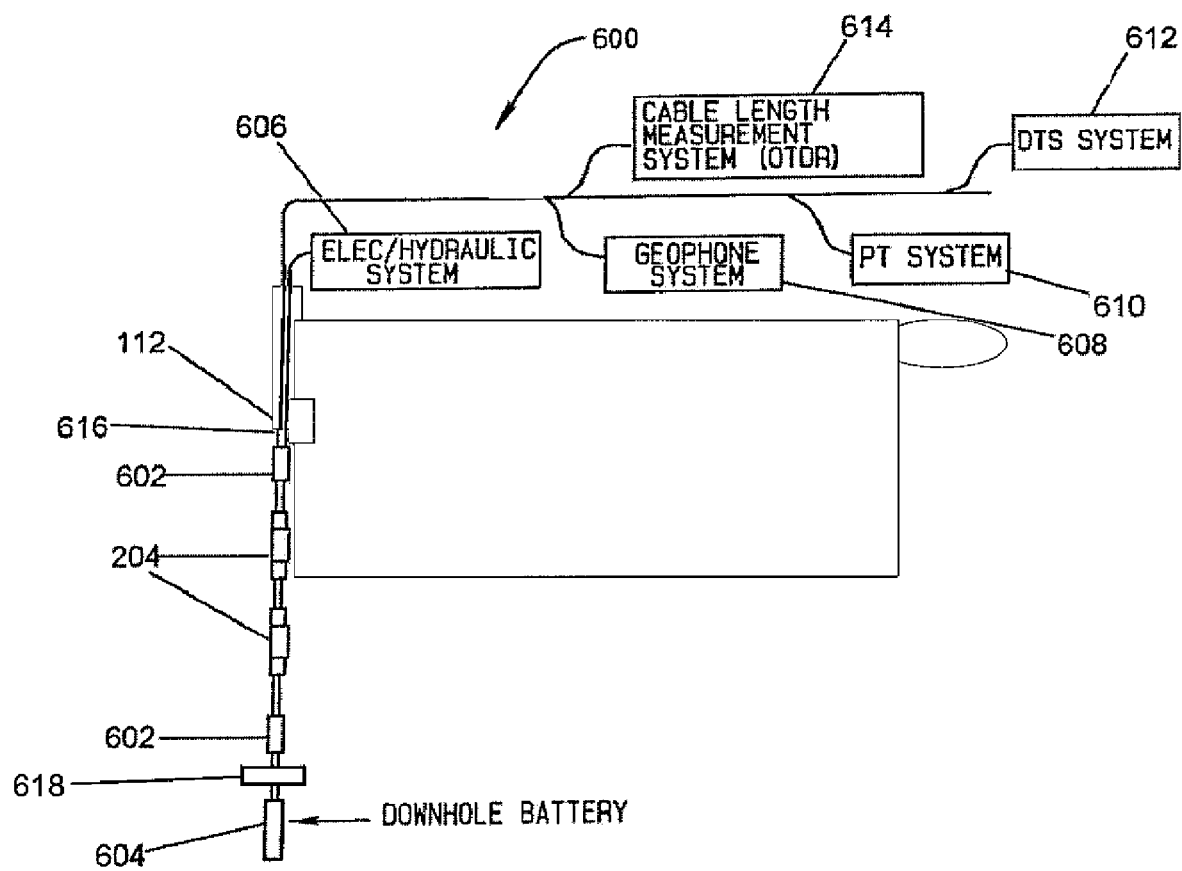
FIG. 6 is a functional diagram of the borehole seismic sensing system.

Referring to FIG. 6, a functional diagram of one embodiment of the borehole sensing apparatus 600 is shown. The apparatus 600 includes a plurality of shuttles 204 along the cable line 112 that contains a sensor and damper package. Other sensors 602 can also be attached along the wireline such as the pressure/temperature (P/T) sensors shown in FIG. 6. The wire line 112 can be adapted to carry various communication lines, including fiber optic sensor array communication lines for the fiber optic system. The wire line 112 can also be adapted to carry the hydraulic line or electrical line actuator control for actuation of the magnetic clamper. Also shown in FIG. 6 is a downhole battery 604 that can be utilized to support various power needs. Various monitoring and control systems can be located at the surface such as the actuator control system 606 which can be operable to control actuation of the magnet clamp. The borehole sensor system 608 can monitor, store, and interpret the data output by the sensors. Also, a P/T sensor system 610 can be located at the surface and communicably linked to a downhole sensor to monitor down-hole pressure and temperature. Still further, a distributed temperature sensor 616 is shown, which is communicably linked to a distributed temperature sensor (DTS) system 612 for providing a continuous temperature profile. Also, a cable length measurement system 614 such as an Optical Time Domain Reflectometer (OTDR) system as shown as the surface can be used. Electrical cartridge 618 is shown on the conveyance below the sensor section. In a further embodiment, the borehole sensors are seismic sensors.

Figure 7:
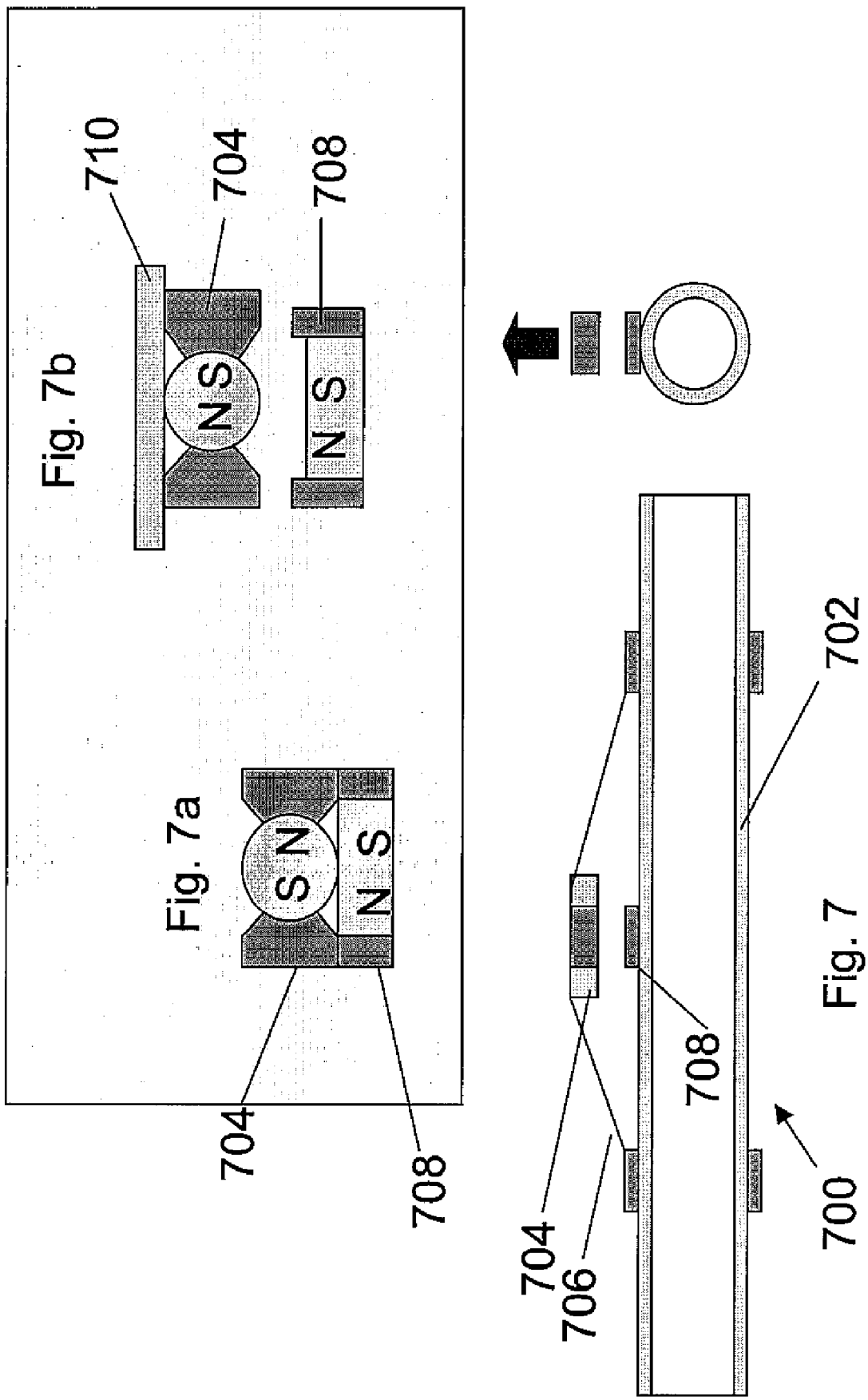

Referring to FIGS. 7, 7a and 7b, a tubing-conveying tool with a bow spring to shuttle interface is shown as an alternative embodiment. The tubing tool 700 is shown comprising a coiled tubing 702 with a shuttle 704 attached thereto by bow spring device 706. The shuttle can be similarly configured as the shuttle described in FIGS. 2, 3, and 4 including the magnet clamp and the sensor package. FIG. 7 illustrates the position of the shuttle when the tension of the bow spring 706 is released, and when the shuttle is extended outward and away from the tubing. The bow spring 706 and shuttle 704 can be held against the tubing. FIGS. 7, 7a and 7b show how the shuttle can be used with a bow spring mechanism that attaches the shuttle to the coiled tubing. When the coiled tubing is deployed, the bow spring can be collapsed against the tubing. A protective mounting, cover, or other such device larger than the shuttle 704 can be provided to hold bow spring 706 against tubing during deployment to protect shuttle 704 from damage during deployment. The magnets 708 attached to the exterior of the coiled tubing and the shuttle can be configured to magnetically attract each other to further hold the shuttle against the tubing. Once the desired depth has been reached, the magnet on the sensor package can be activated via the actuator control line 712 to reverse its polarity such that the shuttle moves away from the coiled tubing by combination of the opposing magnetic forces and the release of the tension on the bow spring. Alternatively the magnet 708 attached to the conveyance can be activated via an actuator control line to reverse its polarity. To retract the shuttle, the magnet can again be reversed. The forces of the magnets are such that they are greater than necessary to collapse the bow spring. FIG. 7a depicts the bow spring in its collapsed position such that the shuttle 704 is collapsed against the magnet 708. FIG. 7b depicts the tension of the bow spring being released thereby extending the shuttle outward and away from the tubing for coupling to the borehole casing 710. The bow spring configuration facilitates coupling of the shuttle to the borehole casing such that establishment of the coupling relationship is not totally reliant on the magnet clamp.

Figure 8:
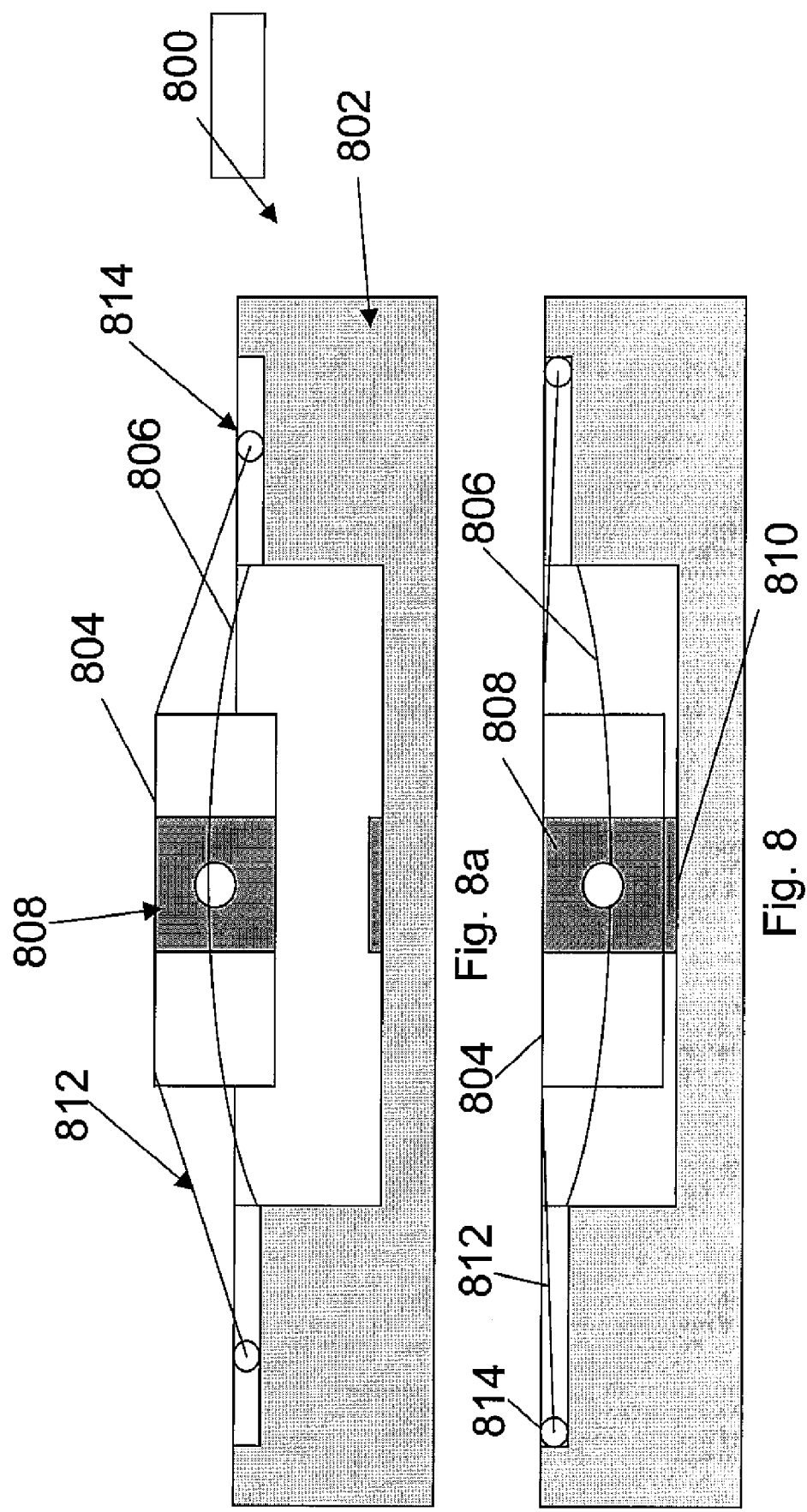

Referring to FIGS. 8 and 8a, a bow spring two-part shuttle for a conveyance is shown. The two-part shuttle 800 comprises an exterior cradle shuttle portion 802 and a main sensor shuttle portion 804 attached thereto by a bow spring mechanism 806. FIG. 8 shows the two-part shuttle with the bow spring collapsed inside the exterior cradle shuttle portion such that the main sensor shuttle portion is cradled within the exterior cradle shuttle portion. The collapsing of the bow spring pushes the main sensor shuttle portion inside which is farther facilitated by the attractive magnetic forces between the magnetic clamp 808 of the main sensor shuttle portion 804 and the magnet 810 attached to the interior of the exterior cradle shuttle portion. A guide 812 and slider 814 mechanism can further facilitate collapse of the bow spring. The exterior cradle shuttle portion can be attached to a wire line and the main sensor shuttle portion can be extended or retracted by the bow spring in combination with the magnetic forces of the magnetic clamp 808 and magnet 810. The extension of the main sensor shuttle portion outward from the exterior cradle shuttle portion as shown in FIG. 8a further facilitates coupling the shuttle to the bore hole casing similar to the shuttle configuration shown in FIG. 7. Again the bow spring facilitates coupling the shuttle to the borehole casing.

Figure 9:
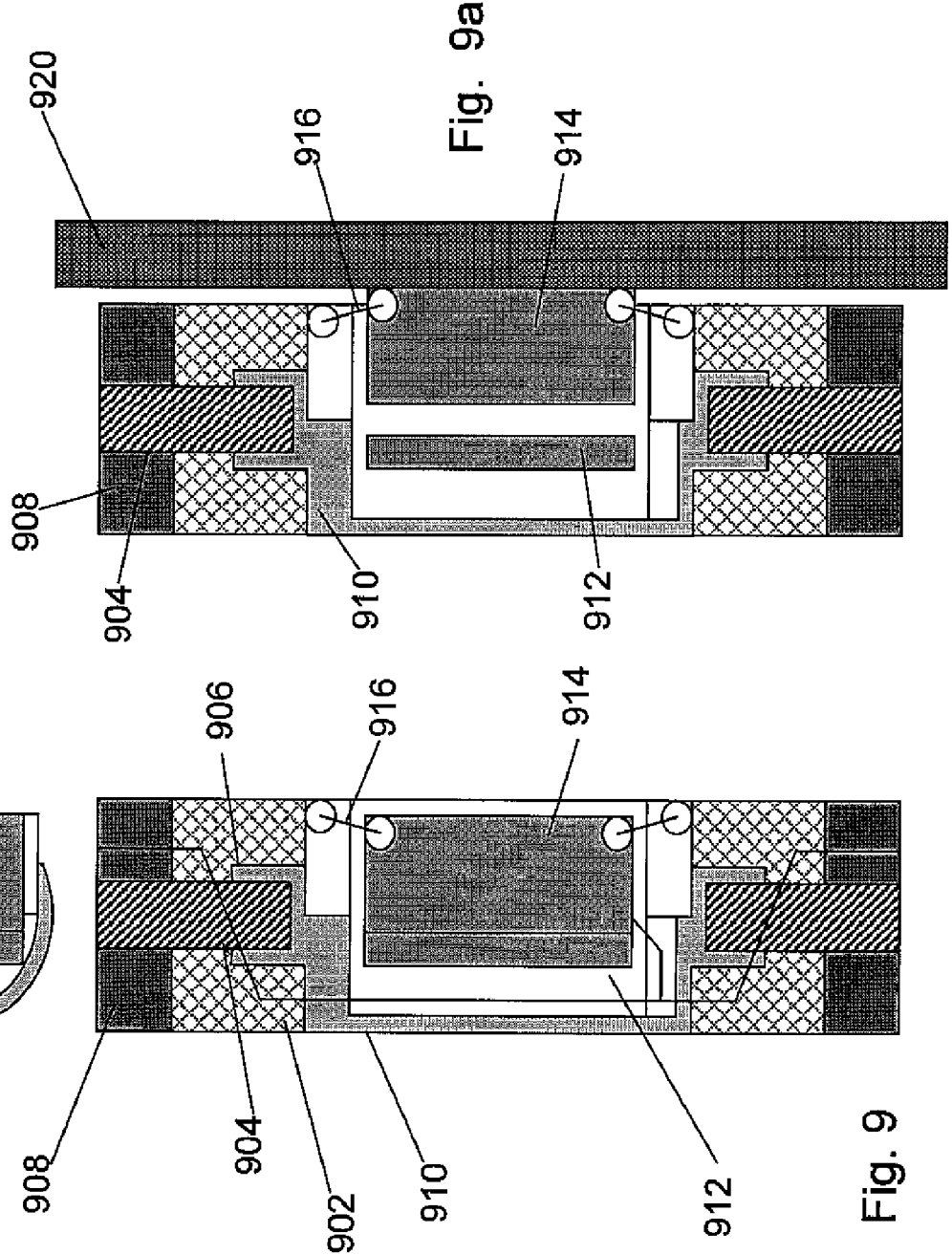

Referring to FIGS. 9 and 9a, a shuttle embedded in a wire line having a bow spring interface is shown. The two-part shuttle design shown in FIGS. 9 and 9a has similar functionality to the shuttle shown in FIGS. 8 and 8a. However, for this embodiment, the shuttle is embedded in the wire line conveyance. The shuttle is embedded and fixed within the conveyance by the mold portion 902. The shuttle is further fixed and embedded within a cable by a stress core 904 and a swage 906. The cable jacket 908 has an outer diameter that is approximately the same as the shuttle device. The shuttle comprises an exterior cradle portion 910 having a magnet 912 therein. The main sensor shuttle portion 914 of the shuttle is attached to the exterior cradle portion 910 by a bow spring mechanism 916. FIG. 9 shows the bow spring in its collapsed position such that the sensor package portion 914 of the shuttle is collapsed within and cradled within the exterior cradle portion 910. Collapsing of the bow spring 916 is facilitated by the attractive forces between the magnet 912 and the magnetic clamp contained within the main sensor package portion 914. FIG. 9a shows the sensor package portion extended outward from the cradle portion of the shuttle to establish a coupling interface between the shuttle and the borehole casing 920.

Figure 10:
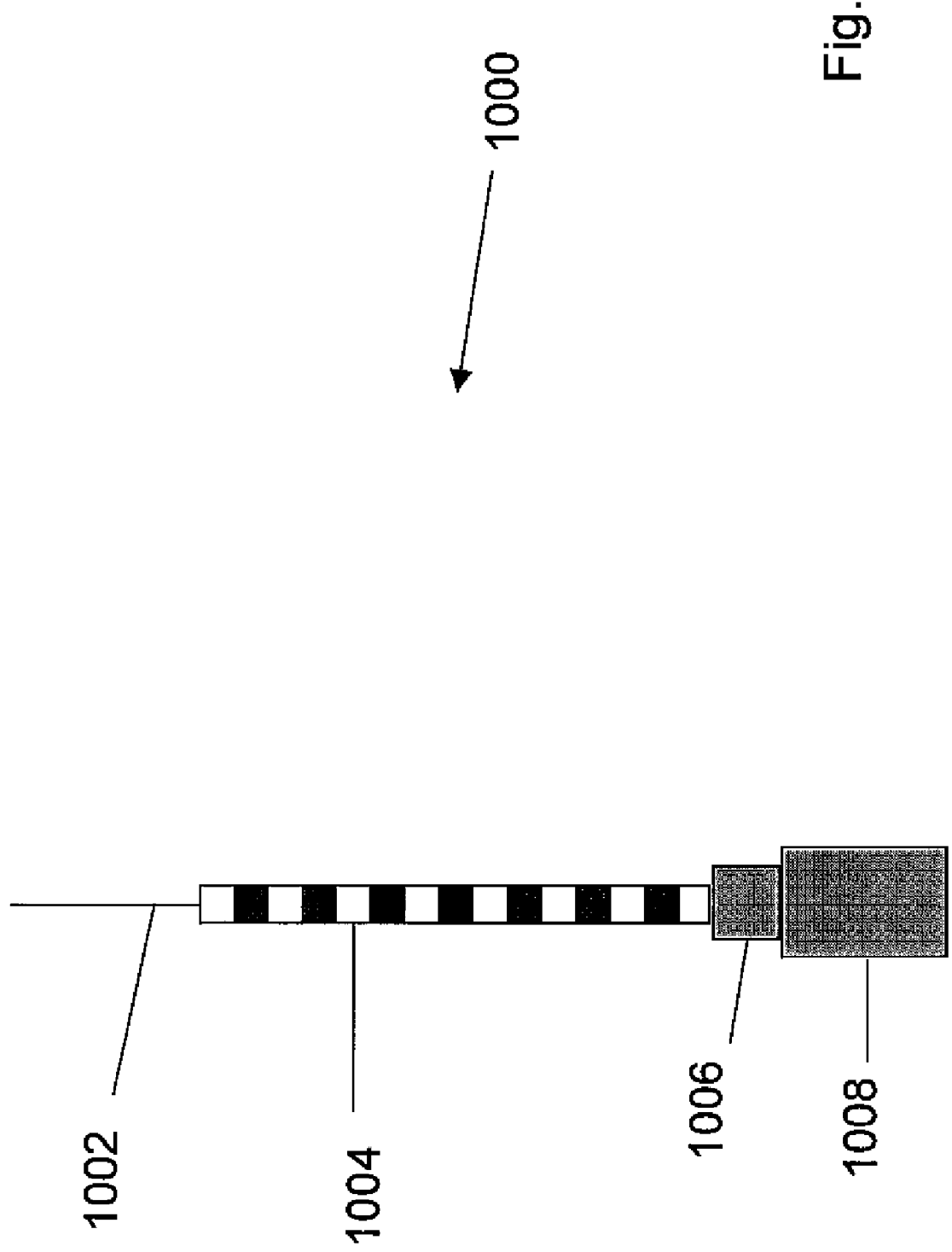
FIG. 10 is a wire line system view showing fishing head.

One embodiment of the borehole sensing apparatus of the present invention as a wire line system is shown in FIG. 10. FIG. 10 is a wire line system view showing the use of a fishing head for retracting a stuck tool. The wire line system tool 1000 is shown comprising a main cable or conveyance 1002, a sensor section 1004, an active fishing head 1006 and a main electronics and weight portion 1008. The sensor section of the tool has a smaller outer diameter than the active fishing head so that an overshoot of a fishing head can run over the sensor section. The shuttles having sensor packages are attached along the sensor section of the conveyance tool. The main electronics and weight portion 1008 can have a larger overall diameter than the overshoot. The weight portion 1008 can also have a protruding end to fit into the overshoot. The protruding end can also be magnetic to attract the overshoot. The active fishing head can optionally have a sensor to detect latching of the overshoot to determine the point where the tool is stuck. Alternatively, a sensor such as a tension meter can be installed in the fishing head or as another alternative a distributed tension measure wire can be installed in the sensor section of the conveyance for sensing tension in the conveyance indicative of a lower portion of the tool, such as the electronics and weight portion 1008, being stuck. A communication line can be provided for transmitting this tension sensing data to the surface. The wire line system tool can be designed such that the portion of the conveyance at the bottom of the sensor section has a weak point so that it is possible to cut and retrieve the sensor section and then subsequently fish the main electronics and weight later. This wire line system tool design enhances the capability of retracting the tool for reuse. If a tool gets stuck it is likely that the larger components of the conveyance will be the components to get stuck. Configuring the conveyance tool such that the larger main electronics and weight are positioned below the sensor section and such that a weak point in the conveyance is positioned there between will allow the conveyance to be cut by applying tension when the larger component is stuck. Once the conveyance is cut the sensor section can be retrieved while leaving the stuck component downhole to be fished later.

A further embodiment comprises providing at least one tension-sensing device on the conveyance at the surface. The tension determined in the conveyance at the weak point can be compared to the tension determined in the conveyance at the surface. Such a comparison can indicate that whether the apparatus is stuck above or below the weak point and can be used in determining actions such as to fish or to break the conveyance.

Some of the above-described methods and apparatus have applicability for both performing borehole surveys for planning well bore drilling and production and for monitoring borehole data during actual well production. Such borehole surveys include borehole seismic surveys and such monitoring of borehole data includes temporary or permanent monitoring. One embodiment comprises a plurality of the shuttles comprising borehole sensor attached along a cable line and spooled down the borehole for permanent or temporary monitoring of seismic data. The plurality of borehole sensor arrays that are attached along the wire line enables the system to record simultaneous multi-level acquisition seismic data. One embodiment utilizes a plurality of these seismic sensor arrays each housed in a plurality of shuttles having acoustic isolation and magnetic clamping capabilities. One embodiment utilizes fiber optic geophone technology. Fiber optic technology has the ability to multiplex multiple channels at a high data rate, thereby satisfying the demand for acoustic and seismic imaging applications which require a large sensor array with high data transmission capabilities. Use of fiber optic technology in embodiments herein also allows for a greater number of shuttles because of the smaller profile, lighter weight and the fact that no downhole electronics or power from the surface is required.

One embodiment is operable to spool downhole a wire line or coiled tubing conveyance having a plurality of shuttle sensor packages spaced along the cable. Shuttles can be optionally embedded in the conveyance as shown in FIGS. 7 through 9. The sensors can optionally all be attached in a conveyance sensor section as shown in FIG. 10. Below the sensor section the larger components can be positioned such as main electronic units, battery units, and weights. Placing the larger components below the smaller diameter sensor section facilitates fishing as shown in FIG. 10 of the sensor section. As discussed above a weak point in the conveyance can be positioned between the sensor section and the larger components such that if the larger components get stuck during retraction of the tool, the spooling mechanism can apply sufficient tension to the conveyance such that the conveyance is cut at the weak point leaving the larger component downhole to be fished later.

One skilled in the art having the benefit of this disclosure will appreciate that a method disclosed above is also attractive in the area of borehole logging because the borehole sensing apparatus and methods described herein can be used in conjunction with a downhole source, such as an acoustic source provided in a sonic tool, to detect response signals at distances further from the source than would be achievable or practical with the receivers contained within the tool that houses the source. It can be appreciated that using a sonic tool with a receiver array such as in the present disclosure to expand the capability of the acoustic data acquisition system without the difficulties and costs involved in expanding the sonic tool itself.

Sensors used in the borehole environment demand an ever increasing bandwidth as the demand for higher resolution sensors increases. Copper cables used for logging in the borehole are reaching the limit for the bandwidth they can provide. Fiber optic cables can provide a significantly higher bandwidth for new high resolution sensors. The use of fiber optic cables requires local power for sensors, and the electronics used to condition sensor signals and to provide telemetry from downhole to uphole requires electrical power.

Photonic power converters (PPCs) are able to convert light into small amounts of power. Therefore, according to principles described herein, an all fiber cable or a hybrid optical/electric cable can be used to provide electrical power downhole. In addition, data and power may be sent and received on a single optical fiber at different wavelengths, or on separate optical fibers. Conventional PPC devices are efficient at short wavelengths of 830 to 880 nm and can provide up to 6V, 2 W of power with 120 mW optical illumination at the device. However, these short wavelengths suffer from dispersion and losses and require the use of multimode fiber over long distances (e.g. up to 5 km). In addition, the surface light source (laser) may have to be 2 W or more at 830 nm to overcome the losses associated with the multimode fiber. A 2 W laser module consumes as much as 20 W-30 W of electrical power. If more power is required downhole, multiple fibers and PPCs can be deployed in parallel. Serial devices downhole requiring power can be deployed on a fiber trunk power fiber with splitters at each required power point. Long wavelengths (about 1310 and 1550 nm) used in single mode communications may also be used with PPCs, but the efficiency may be reduced. Moreover, a single mode fiber exhibits lower losses than a multimode fiber, and a single mode fiber can provide very high data rates over several 10's of kilometers.

In some embodiments of the present invention, GaAs based PPC devices are used downhole and are operational at high temperatures. In some cases, the conversion efficiency of GaAs PPCs is reduced at temperatures above 150° C. Nevertheless, GaAS PPCs are capable of delivering power up to at least 200-250° C. Generally, the limiting operational factor of GaAs PPCs at temperatures of 150-250° C. is the packaging materials. Accordingly, some embodiments described herein include GaAs that are packaged to withstand temperatures of at least 150-200° C. as described below with reference to FIG. 13. However, as used herein, "high temperature" refers to temperatures greater than 120° C.

Accordingly, in some embodiments, the PPC exhibits at least 20% efficiency at temperatures up to at least 150° C. In one embodiment, the PPC delivers at least 20% efficiency at temperatures up to at least 200° C. In one embodiment, the PPC comprises at least 20% efficiency at temperatures up to at least 150° C. and light wavelengths of at least 1100 nm. In one embodiment, the PPC comprises at least 20% efficiency at temperatures up to at least 200° C. and light wavelengths of at least 1260 nm. In one embodiment, the photonic power converter comprises at least 20% efficiency at temperatures up to at least 150° C. and light wavelengths of at least 1550 nm. In one embodiment, the photonic power converter comprises at least 30% efficiency at temperatures up to at least 200° C. and light wavelengths of at least 1310 nm. Such PPCs may comprise InGaAS PPCs grown on GaAs substrates with property selected composition and thickness. In one embodiment, the PPCs comprise a thick epi layer (up to 20 um). In some embodiments, particularly long wavelength PPCs, the PPCs comprise InGaAs, InGaAsP, or InP substrates with relatively high indium content. In some embodiments, the indium content is about 53%. PPCs having InP substrates may include backside illumination. Some of the PPCs with the above-identified characteristics may be purchased, for example, from Photonic Power Systems, Inc. Nevertheless, other PPCs may also be used that are not limited by the above-identified characteristics.

As referred to above, fiber optic cables have very efficient transmission capabilities, frequently on the order of several hundred megabytes per second at distances up to 40 km and do not suffer from EMI or transmission loss like copper telemetry systems do. However, optic transmission systems need power to drive the associated electronics required to control the optic data transmission. An optic transmission system associated with a borehole may include an LED or laser diode (LD) source that is amplitude modulated by associated electronics. For efficient communications, in some embodiments LEDs or LDs are located both uphole and downhole to enable full duplex transmission. Aspects of the disclosure herein contemplate use of devices disclosed in U.S. patent application Ser. No. 11/017,264, filed Dec. 20, 2004, and entitled "Methods and Apparatus for Single Fiber Optical Telemetry", the entire contents of which are hereby incorporated herein by reference.

In one embodiment, a single fiber may convey power downhole to remote electronic devices using a surface high power laser (e.g. a continuous wave (CW) laser). The CW light is conveyed over a length of optical fiber to a downhole system where it is received by a PPC. The PPC converts the CW light into a voltage used to power downhole electronics, data converters connected to downhole sensors, and/or sensors themselves. In some embodiments, PPC power is used to modulate a downhole optical source (e.g. LED or LD) of a different wavelength to transmit digital data from downhole sensors, electronics, and/or data converters uphole along the same optical fiber used to power downhole devices. An optical coupler or optical circulator and an add/drop multiplexer such as a WDM (wavelength division multiplexed) splitter may be used so that modulated optical signal relaying downhole data is conveyed to the surface without interference from the surface laser. Resultant optical signals (representing downhole data) may be received by an uphole photodiode sensitive to the downhole optical source wavelength and converted to an electrical digital signal. The electrical digital signal may then be stored or used to monitor downhole conditions. According to principles described herein, downhole devices including, but not limited to, acoustic, pressure, and temperature sensors, optical components requiring power such as optical switches, blaze gratings, chemical, fluid phase, fluorescence sensors and detectors, imaging devices, video cameras, low power sensors, such as micro-sapphire gauges, associated electronics for conditioning signals received by the sensors, actuators and controls, MEMS devices or MEMS sensors, and/or integrated conditioning, support, and data conversion electronics may be powered by an uphole light source. In some cases, power provided by a surface optical source may not be sufficient to power sensors or support electronics, and therefore the power converted by the PPC may be used to trickle charge or augment power supplied by downhole battery packs.

Figure 11:
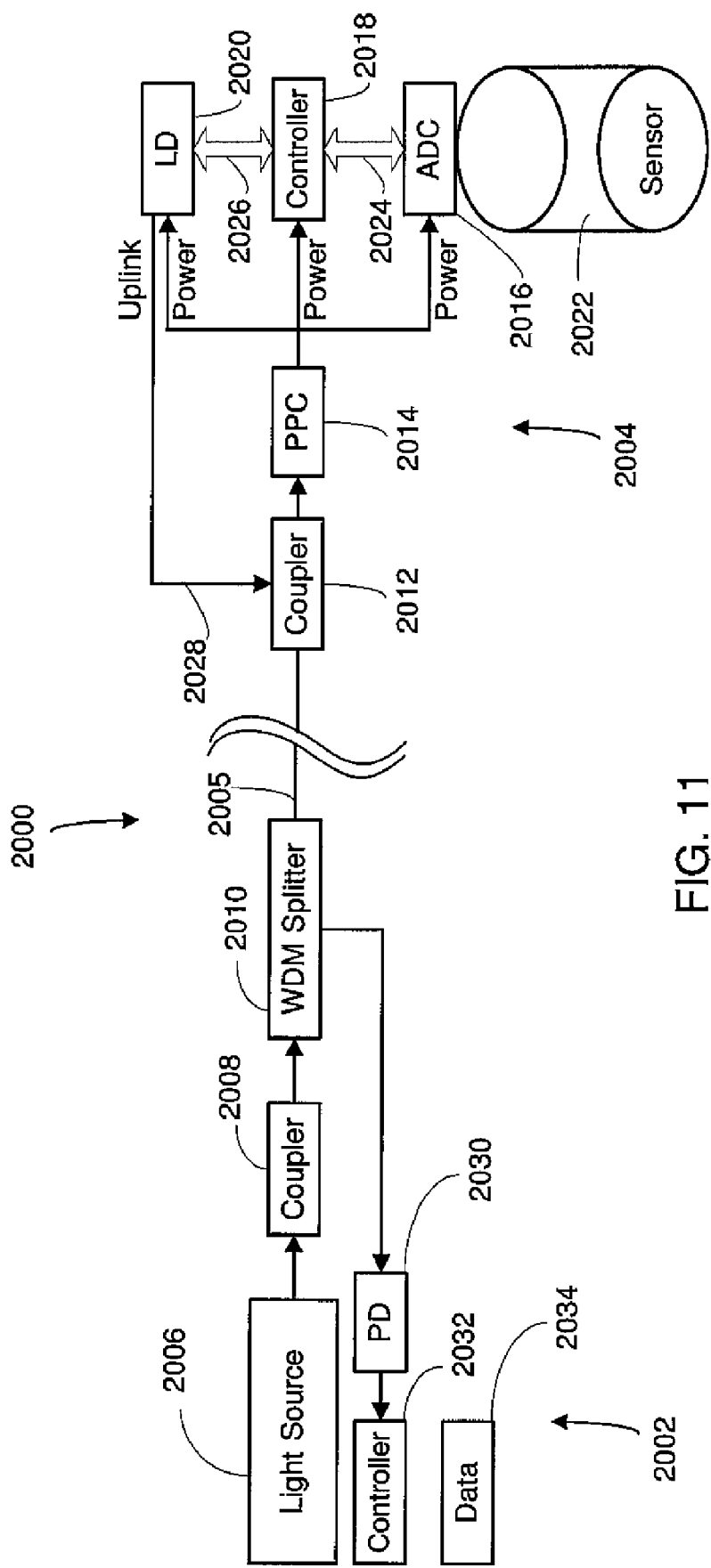
FIG. 11 is a schematic representation of a downhole oilfield sensor system according to one embodiment.

One exemplary architecture that may be used according to principles described herein is illustrated in FIG. 11. According to the embodiment of FIG. 11, there is a subterranean sensor system 2000 that may be divided into an uphole section 2002 and a downhole section 2004 connected by an optical fiber 2005. The optical fiber 2005 may be one single mode fiber. In one embodiment, the uphole section 2002 of FIG. 11 includes an optical source such as laser source 2006. A first optical coupler 2008 connects the laser source 2006 to a WDM splitter 2010. The WDM splitter passes light of a certain wavelength (or wavelengths) to the optical fiber 2005. The optical fiber 2005 transmits the light downhole to the downhole section 2004. In one embodiment, the downhole section 2004 includes a second optical coupler 2012 connected between the optical fiber 2005 and a downhole PPC 2014. The downhole PPC 2014 converts the light from the laser source 2006 to a voltage that can power downhole electronics.

In one embodiment, the PPC 2014 provides downlink power to multiple downhole devices. For example, as shown in FIG. 11, the PPC 2014 powers sensor electronics 2016, a controller 2018, and a laser diode 2020. The PPC 2014 may also power one or more sensors 2022. Interfaces 2024, 2026 facilitate communication between the sensor electronics 2016 and the controller 2018, and between the controller 2018 and the laser diode 2020, respectively.

In one embodiment, the controller 2018 modulates the laser diode 2020 to relay downhole data to the surface. Modulated light from the laser diode 2020, which has a different wavelength than the light from the uphole laser source 2006, is relayed by an uplink 2028 to the second optical coupler 2012. The modulated light from the laser diode 2020 passes through the coupler 2012 back up the optical fiber 2005 to the uphole section 2002. The modulated light from the laser diode 2020 may also be transmitted uphole by a second optical fiber. When the modulated light from the laser diode 2020 reaches the uphole section 2002, the WDM splitter 2010 directs the light to an uphole photo diode 2030. The photo diode 2030 converts the modulated light into electrical signals received by an uphole controller 2032 and recorded or displayed by a data recorder 2034. Accordingly, in one embodiment, the downhole sensor 2022 and electronics are powered by light from an uphole source 2006, and data from the downhole sensor 2022 (and others) may be transmitted uphole at high rates via the optical fiber 2005. Accordingly, one optical fiber may be used to send power and data downhole, as well as receive data uphole. In some embodiments, the optical fiber 2005 may comprise multiple optical fibers, and may be accompanied by electrical cables as well.

Another schematic of a downhole oilfield sensor system 2100 is shown according to one embodiment in FIG. 12A. The downhole oilfield sensor system 2100 may include a surface data acquisition/controller unit 2102 in optical and/or electrical communication with a main fiber optic cable 2104 intended to extend—or extending—downhole. The surface data acquisition/controller unit 2102 includes an uphole light or optical source 2108 coupled to the fiber optic cable or optical fiber 2104. The surface data acquisition/controller unit 2102 may also includes an uplink optical-to-electrical (OE) demodulator 2106. The optical source 2108 may comprise a laser, a high powered laser, a light-emitting diode (LED), a white light source, or other optical source. The optical source 2108 may provide light at one or more wavelengths. For example, the optical source 2108 may provide light downhole at wavelengths that can be split into $\lambda_1$, $\lambda_3$, and $\lambda_5$. The OE demodulator 2106 may comprise at least a first photo detector or diode that receives optical uplink data sent at a first light wavelength ($\lambda_2$) and converts it to electrical signals that can be received and/or interpreted by the data acquisition/controller unit 2102. The optical fiber 2104 may comprise a single mode optical fiber in some embodiments.

The downhole oilfield sensor system 2100 of FIG. 12A also includes a downhole system. The downhole system may include multiple modules. For example, FIG. 12 illustrates three downhole tool modules 2110, 2112, and 2114 that may be part of a wireline tool, a permanent installation, or other apparatus. However, the downhole system may include any number of modules. The first downhole tool module 2110 may be associated with the first downlink wavelength of light $\lambda_1$ for receiving power and/or communication from the surface. The first downlink wavelength $\lambda_1$ may be a long wavelength (meaning over 940 nm), for example a wavelength of 1260 nm. Accordingly, in one embodiment, the first downlink wavelength light $\lambda_1$ from the optical source 2108 may be transmitted along the optical fiber 2104. A junction such as a downhole WDM coupler/splitter 2116 directs the first wavelength light 1a along an optical lead or branch 2118 to the first downhole tool module 2110. In one embodiment, the first downhole tool module 2110 includes a first PPC 2120 for converting light of the first wavelength $\lambda_1$ to a voltage. The first downhole tool module 2110 may also include a photo detector for receiving data. It will be understood that the downlink wavelengths may also comprise low wavelengths in some embodiments, including, but not limited to: 830 nm and 940 nm. PPCs that function at high temperatures for long and short wavelengths are available from Photonic Power Systems. The packaging of the PPCs for high temperature may be as described below with reference to FIGS. 13-15.

Similar or identical to the arrangement of FIG. 11, the PPC 2120 of the first downhole tool module 2110 may provide downlink power to multiple downhole devices. For example, as shown in FIG. 12A, the PPC 2120 may power sensor electronics 2122, a controller 2124, a laser diode 2126 and possibly one or more sensors 2128.

Sensor 2128 data may be modulated into the laser diode 2126 by the controller 2124 and relayed to the uplink optical-to-electrical (OE) demodulator 2108 of the surface data acquisition/controller unit 2102 at the surface. In one embodiment, modulated light from the laser diode 2126 has a different wavelength than the first wavelength $\lambda_1$ emitted by the uphole optical source 2106. For example, the laser diode 2126 may be tuned to a wavelength of $\lambda_2$. The modulated light of wavelength $\lambda_2$ from the laser diode 2126 is relayed by an uplink 2130 through the optical splitter/coupler 2116. The modulated light of wavelength $\lambda_2$ from the laser diode 2126 passes through the coupler back up the optical fiber 2104 to the uphole data acquisition/controller unit 2102. The modulated light from the laser diode 2126 may also be transmitted uphole by another optical fiber. When the modulated light wavelength $\lambda_2$ from the laser diode 2126 reaches the data acquisition/controller unit 2102, a WDM splitter 2134 directs the light to the associated $\lambda_2$ OE demodulator 2106. The OE demodulator 2106 converts the modulated light into electrical signals received and recorded or displayed by data acquisition/controller unit 2102.

Similar or identical to the operation between the surface data acquisition/controller unit 2102 and the first tool module 2110, the second and third tool modules 2112, 2114 may be powered by the uphole optical source 2108 (or dedicated optical sources) and relay information back to the surface along one single mode optical fiber or a number of optical fibers. Accordingly, each of the second and third tool modules 2112, 2114 may contain its own PPC, sensor(s), and laser diodes associated with a different wavelength of light. However, a single PPC and laser telemetry source may be common to all three tool modules 2110, 2112, 2114 in some embodiments.

In one embodiment, the second tool module 2112 receives light at a third wavelength $\lambda_3$ via an associated optical splitter/coupler 2136. The third wavelength $\lambda_3$ may also be a long wavelength, for example 1310 nm and may be transmitted along optical fiber 2104, or along either of fiber optic lines 2140 and 2142. The second tool module 2112 then modulates light at a fourth wavelength $\lambda_4$ and communicates the data uphole in the same manner explained with respect to the first tool module 2110 above. That is to say, light modulated at the second tool module 2112 is directed to an associated photo detector of the data acquisition/controller unit 2102 tuned to $\lambda_4$.

In one embodiment, the third tool module 2114 receives light at a fifth wavelength $\lambda_5$ via an associated optical splitter/coupler 2138. The fifth wavelength $\lambda_5$ may also be a long wavelength, for example 1550 nm and may be transmitted along optical fiber 2104, or along either of fiber optic lines 2140 and 2142. The third tool module 2114 then modulates light at a sixth wavelength $\lambda_6$ and communicates the data uphole in the same manner explained with respect to the first and second tool modules 2110, 2112. Light modulated at the third tool module 2114 is directed to an associated photo detector of the data acquisition/controller unit 2102 tuned to $\lambda_6$. Any number of downhole tool modules and sensors may be used.

FIG. 12A shows that multiple fiber optic lines 2140, 2142 may optionally be included and connected to one or more of the tool modules 2110, 2112, 2114 in various configurations to send power and data downhole, or send data uphole. The light transmission wavelengths may be short or long, and the optical fibers extending between downhole and surface devices may be single mode or multi-mode. Nevertheless, there are advantages to using long wavelength sources and single mode optical fibers as discussed above to reduce losses. Moreover, some embodiments may include a hybrid cable comprising both the fiber optic cables 2104, 2140, and 2142 and copper wires 2143. The copper wires 2143 may provide power in some embodiments, or they may be used for communication, timing, or omitted altogether.

In embodiments employing long wavelength light sources in a downhole environment, the PPCs may be adequately packaged to operate at high temperatures. In one embodiment, the PPCs are packaged as shown schematically in FIG. 13. According to the embodiment of FIG. 13, a single unit 2400 comprises an integrated PPC 2410 and a MEMS sensor(s) 2412. The single unit 2400 is coupled to an optical fiber 2402, which may comprise a metalized optical fiber with a fiber tip treatment (e.g. polyimide, aluminum, gold, etc.). Fiber tip treatment tends to improve the number aperture (NA) of the fiber 2402, where a higher NA indicates a higher optical coupling efficiency.

Figure 13:
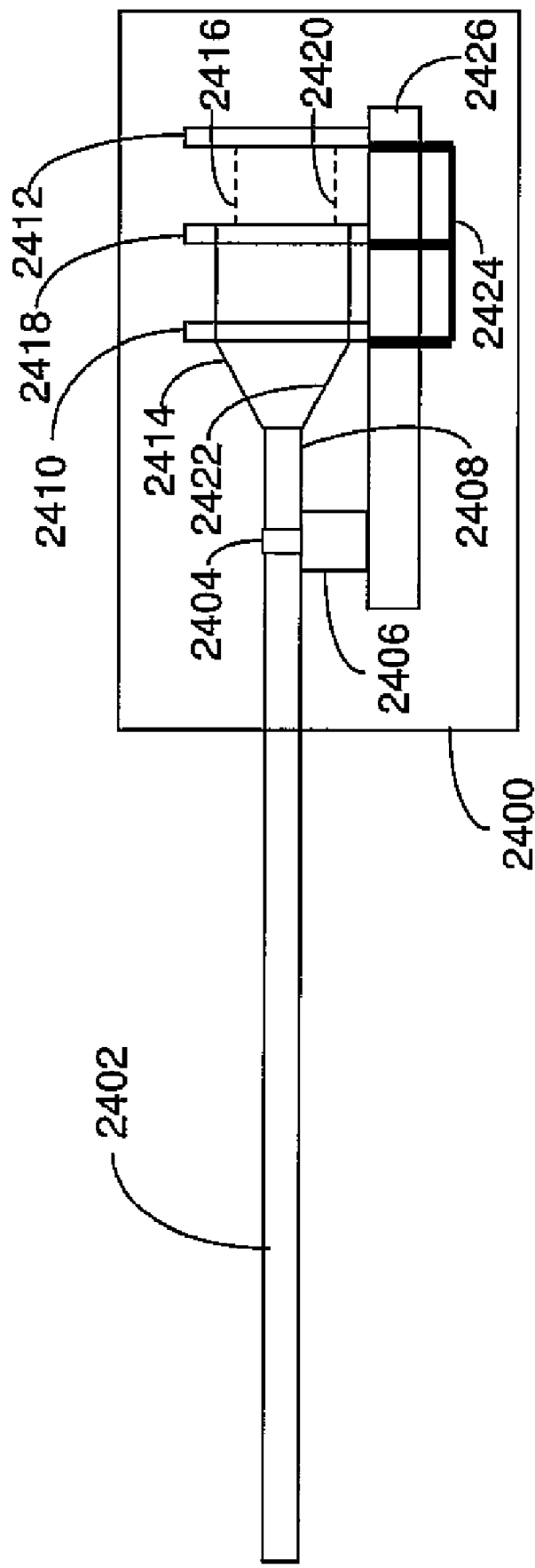
FIG. 13 illustrates high temperature PPC packaging according to one embodiment.

In one embodiment, the optical fiber 2402 is connected to the single unit 2400 at a high temperature welding point 2404. A fiber alignment holder 2406 may be used to align the fiber 2402 at the welding point 2404 with a subsequent fiber segment 2408. Light for powering the MEMS sensor 2412 is directed via a first waveguide 2414 to the PPC die 2410. The PPC die 2410 converts the light to a voltage, which powers the MEMS sensor 2412 via wire 2416. The PPC die 2410 may be optimized or for a specific wavelength of light and be transparent to other wavelengths. In the embodiment of FIG. 13, light wavelength of a laser diode die 2418 (e.g. a GaAs laser diode) can pass through the PPC and couple to the optical fiber 2408 (and therefore fiber 2402, for example, to transmit data from the MEMS sensor 2412 uphole). MEMS sensor 2412 data is communicated via line 2420 and telemetered via the laser diode die 2418. Light from the laser diode die 2418 may be transmitted via the first or a second optical waveguide 2414/2422. Gold wires 2424 may interconnect the PPC die 2410, the laser diode die 2418, and the MEMS sensor 2412. A submount 2426 may mount the PPC die 2410, the laser diode die 2418, and the MEMS sensor 2412. The entire single unit 2400 may be encapsulated by a high temperature optical transparent epoxy, such as, for example, KJR-9022E, KJR-9023E available from Shin-Etsu Chemical Co., Ltd., as a single sensor/PPC package.

In some embodiments, downhole sensors may comprise MEMS devices or MEMS sensors operatively connected to an optical fiber. Referring to FIGS. 14-15, two embodiments of downhole systems including packages housing MEMS sensors 2200 are shown. As shown in FIGS. 14-15, in some embodiments, downhole systems may be miniaturized and require reduced power requirements. FIGS. 14-15 each illustrate a MEMS sensor 2200 housed in a high temperature resistant pumpable package 2202. In some embodiments, the pumpable package 2202 may have a length on the order of 10-20 mm and a diameter of about 0.25-0.5 mm to about 3-15 mm. In one embodiment, the length of the pumpable package is approximately 10 mm and the diameter is approximately 5 mm. In the embodiments of FIGS. 14-15, the MEMS sensor 2200 is integrated on a substrate such as a silicon substrate 2204. Moreover, a PPC 2206 may also be integrated on the silicon substrate 2204.

The pumpable package 2202 is connected to an optical fiber such as the optical fibers 2005 (FIG. 11) and 2104 (FIG. 12) discussed above that are connected to surface light sources and data acquisition equipment. The optical fiber 2005/2104 connects to an optical coupler 2210 in each of FIGS. 14 and 15. A first waveguide 2212 directs light from the surface to the PPC 2206. The PPC 2206 powers the MEMS sensor 2200 and, in the case of the embodiment of FIG. 14, a telemetry driver such as the high temperature laser diode 2208. Data from the MEMS sensor 2200 is communicated uphole by modulating a light source such as the laser diode 2208. In the embodiment of FIG. 14, the laser diode 2208 is modulated and the light is returned uphole after passing through an isolator 2214 in the pumpable package 2202. In one embodiment, the isolator 2214 only allows a preselected wavelength of light to pass through, thereby enabling an uphole data acquisition unit to determine what sensor is reporting data and eliminating possible interference. In the embodiment of FIG. 15, rather than including the laser diode 2208, the MEMS sensor 2200 also comprises a telemetry driver that directly modulates its own light source 2216. Therefore, the MEMS sensor 2200, as with all of the sensors mentioned herein, may be optical or electrical.

Figure 16:
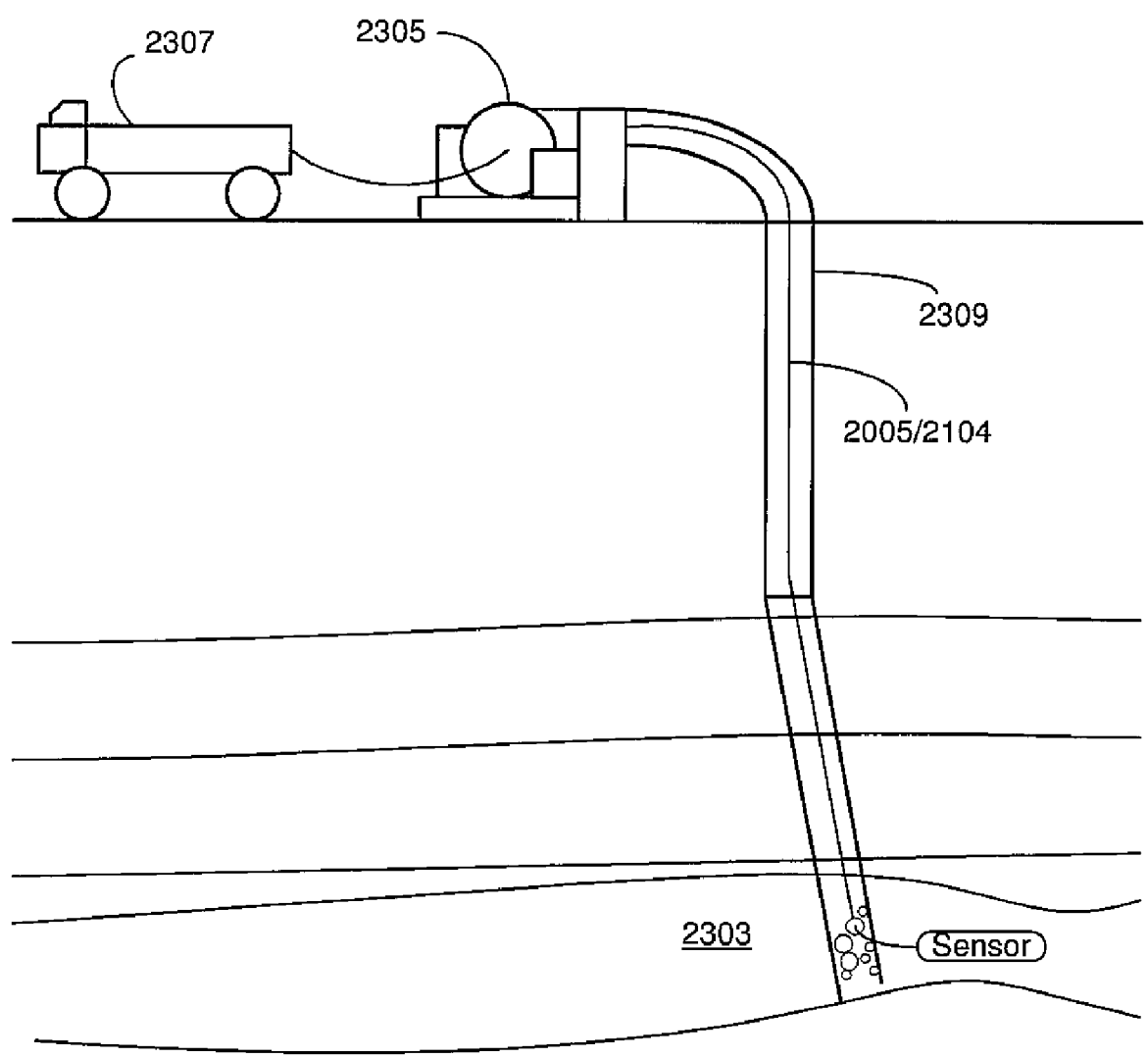
FIG. 16 illustrates pumping a MEMS sensor into a formation according to one aspect.

The pumpable package 2202 shown in FIGS. 14-15 may be pumped downhole for monitoring according to any method. For example, as shown in FIG. 16, the pumpable package 2202 attached to the fiber optic line 2005/2104 and including a PPC may be pumped downhole into a formation 2303 through a suitable tube conveyance, such as tubing, casing, any thin line conveyance or control line, and into the small cracks found in the formation. A pumping unit 2305 that may be attached to a truck 2307 may be used to pump the package 2202 down through a wellbore 2309 and into the formation 2303. Alternative means of deployment of pumpable package 2202 may be utilized, such as, for example, by deploying the package into a single length of suitable thin line tubing or method of conveyance, and attached along, (annulus) or inside the tubing in a wellbore, with a suitable check and seal valve located at the lower end of the control line. The package may be deployed by pumping fluid, and after the package is situated at the valve, the package may be sealed against the tubing after stopping pumping and releasing pressure to acquire sensor data.

The preceding description has been presented only to illustrate and describe the invention and some examples of its implementation. It is not intended to be exhaustive or to limit the invention to any precise form disclosed. Many modifications and variations are possible in light of the above teaching.

The preferred aspects were chosen and described in order to best explain the principles of the invention and its practical application. The preceding description is intended to enable others skilled in the art to best utilize the invention in various embodiments and aspects and with various modifications as are suited to the particular use contemplated. It is intended that the scope of the invention be defined by the following claims.

What is claimed is:

1. An optical architecture, comprising:
   a first uphole system comprising:
      an amplified broad band light source;
      a first optical coupler connected to the amplified light source;
      a wavelength division multiplexed splitter downstream of the optical coupler;
      an uplink photodiode split from the wavelength division multiplexed splitter;
      a controller downstream of the photodiode;
   a second downhole system comprising:
      a second optical coupler;
      a photonic power converter in optical communication with the second optical coupler;
      an electronics package powered by the photonic power converter;
      an uplink modulated optical source optically connected to the second optical coupler;
   a single optical fiber extending between the first and second systems, the single optical fiber transmitting light from the amplified light source in a first direction to the photonic power converter, and data from the second system in a second direction to the photodiode.

2. An optical architecture of claim 1, wherein the second system comprises a sensor in communication with the uplink modulated optical source.

3. An optical architecture of claim 1, wherein the uplink modulated optical source is powered by the photonic power converter.

* * * * *